US012761420B2

(12) United States Patent
Asada

(10) Patent No.: US 12,761,420 B2
(45) Date of Patent: Oct. 13, 2026

(54) OPTICAL TRANSMISSION DEVICE, OPTICAL TRANSMISSION DEVICE PRODUCTION METHOD, AND OPTICAL CABLE SYSTEM

(71) Applicant: NEC Corporation, Tokyo (JP)

(72) Inventor: Hideo Asada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 315 days.

(21) Appl. No.: 18/579,916

(22) PCT Filed: Sep. 29, 2021

(86) PCT No.: PCT/JP2021/035878
§ 371 (c)(1),
(2) Date: Jan. 17, 2024

(87) PCT Pub. No.: WO2023/053273
PCT Pub. Date: Apr. 6, 2023

(65) Prior Publication Data
US 2024/0319443 A1 Sep. 26, 2024

(51) Int. Cl.
*G02B 6/255* (2006.01)
*G02B 6/35* (2006.01)

(52) U.S. Cl.
CPC ......... *G02B 6/2551* (2013.01); *G02B 6/3546* (2013.01)

(58) Field of Classification Search
CPC ............................ G02B 6/2551; G02B 6/3546
See application file for complete search history.

(56) References Cited

U.S. PATENT DOCUMENTS 8,725,001 B2 * 5/2014 Fini ........................ H04J 14/052 398/145
2021/0088729 A1 3/2021 Bradley et al.

FOREIGN PATENT DOCUMENTS

| | | | | |
|---|---|---|---|---|
| JP | H0291609 | A | * | 3/1990 |
| JP | H09-258082 | A | | 10/1997 |
| JP | 2015-510253 | A | | 4/2015 |
| JP | 2016-057447 | A | | 4/2016 |
| JP | 2016-111480 | A | | 6/2016 |
| WO | 2019/188462 | A1 | | 10/2019 |

OTHER PUBLICATIONS

English translation of JP H0291609A (Year: 1990).*
International Search Report for PCT Application No. PCT/JP2021/035878, mailed on Dec. 21, 2021.
English translation of Written opinion for PCT Application No. PCT/JP2021/035878, mailed on Dec. 21, 2021.
Nooruzzaman, Md. and Morioka, Toshio, "Multi-core Fiber Undersea Transmission Systems", 2017 European Conference on Networks and Communications, 2017.

* cited by examiner

*Primary Examiner* — Sung H Pak
(74) *Attorney, Agent, or Firm* — Sughrue Mion, PLLC

(57) ABSTRACT

An optical transmission device being connected to an optical cable including a first multicore fiber including a plurality of cores, the optical transmission device including: an optical processor including a multicore fiber interface including a second multicore fiber including a plurality of cores being able to be fusion-spliced to an end portion of the first multicore fiber; and at least one optical component being connected to the multicore fiber interface and being configured to execute predetermined processing on each piece of light being coupled to the plurality of cores of the multicore fiber interface.

12 Claims, 21 Drawing Sheets

OPTICAL TRANSMISSION DEVICE, OPTICAL TRANSMISSION DEVICE PRODUCTION METHOD, AND OPTICAL CABLE SYSTEM

This application is a National Stage Entry of PCT/JP2021/035878 filed on Sep. 29, 2021, the contents of all of which are incorporated herein by reference, in their entirety.

TECHNICAL FIELD

The present invention relates to an optical transmission device, a method of manufacturing an optical transmission device, and an optical cable system, more particularly to an optical transmission device and the like that can be connected to a multicore fiber.

BACKGROUND ART

In a submarine cable system that transmits an optical signal by using an optical submarine cable, an optical transmission device such as an optical repeater and an optical branching device is installed on the sea floor. Further, in recent years, in order to expand a transmission capacity, a multicore fiber (MCF) in which a plurality of cores are arranged in one optical fiber has also been adopted in the submarine cable system. In contrast, an optical fiber in which only one core is arranged in one optical fiber is also referred to as a single core fiber (SCF).

A general optical component such as an optical attenuator and an optical amplifier is connected to a single core fiber. Thus, optical components referred to as a fan-in and a fan-out are used for individually connecting cores of a multicore fiber and optical components to each other. The fan-in couples light being output from cores of a plurality of single core fibers, to cores of a multicore fiber. Further, the fan-out couples light being output from the plurality of cores of the multicore fiber, to the single core fibers different from one another. An optical component including an interface that can be connected to the single fiber core and an interface that can be connected to the multicore fiber may be used as the fan-in, or may be used as the fan-out. In the following description, the fan-in and the fan-out are collectively referred to as a "FIFO" unless there is a need for specific differentiation therebetween.

FIG. 22 is a block diagram illustrating a configuration of a general optical transmission device 900 being connected to a multicore fiber. The optical transmission device 900 includes an optical circuit 910. The optical circuit 910 includes a wavelength selective switch (WSS) 901, an optical switch (OSW) 902, and a variable optical attenuator (VOA) 903. The optical transmission device 900 is connected to outside of the optical transmission device 900 via MCFs 921 to 923 each including four cores. The optical circuit 910 is connected to the MCFs 921 to 923 via FIFOs 911 to 913. The optical components inside the optical circuit 910, and the optical circuit 910 and the FIFOs 911 to 913 are connected to one another via single core fibers.

In relation to the present invention, PTL 1 describes a technique relating to an optical path switching device in a multifiber network. Further, PTLs 2 and 3 describe a technique relating to an optical branching device to be used in a submarine cable system.

CITATION LIST

Patent Literature

PTL 1: Japanese Unexamined Patent Application Publication No. 2016-111480

PTL 2: Japanese Unexamined Patent Application Publication No. H09-258082

PTL 3: International Patent Publication No. WO2019/188462

SUMMARY OF INVENTION

Technical Problem

As described with reference to FIG. 22, in an optical transmission system using a multicore fiber, it is required that an optical transmission device including an optical circuit using a general optical component be connected to the multicore fiber in some cases. In this case, it is required to provide a FIFO to the optical transmission device and connect the multicore fiber outside the optical transmission device and a single core fiber of the optical circuit to each other by using the FIFO. Thus, a manufacturer of the optical transmission device is required to prepare a new FIFO for connecting the optical circuit and the multicore fiber to each other at a time of manufacturing the optical transmission device. Further, the manufacture is required to connect the optical circuit and each of the cores of the multicore fiber by using the FIFO.

OBJECT OF INVENTION

An object of the present invention is to provide a technique of facilitating connection between a multicore fiber and an optical transmission device at a time of manufacturing the optical transmission device applied to an optical transmission system using a multicore fiber.

Solution to Problem

An optical transmission device according to the present invention is an optical transmission device being connected to an optical cable including a first multicore fiber including a plurality of cores, and includes an optical processing means including a multicore fiber interface including a second multicore fiber including a plurality of cores being able to be fusion-spliced to an end portion of the first multicore fiber, and at least one optical component being connected to the multicore fiber interface and being configured to execute predetermined processing on each piece of light being coupled to the plurality of cores of the multicore fiber interface.

A method of manufacturing an optical transmission device according to the present invention is a method of manufacturing an optical transmission device being connectable to a first multicore fiber that is provided to an optical cable and includes a plurality of cores, and includes a procedure of fusion-splicing an optical processing means to the optical cable at one end of the multicore fiber interface, the optical processing means including a multicore fiber interface including a second multicore fiber including a plurality of cores being connectable to an end portion of the first multicore fiber, and at least one optical component being connected to another end of the multicore fiber interface and being configured to execute predetermined processing on each piece of light being coupled to the plurality of cores of the multicore fiber interface.

Advantageous Effects of Invention

According to the present invention, a multicore fiber and an optical transmission device can easily be connected to each other at a time of manufacturing the optical transmission device.

EXAMPLE EMBODIMENT

Figure 1:
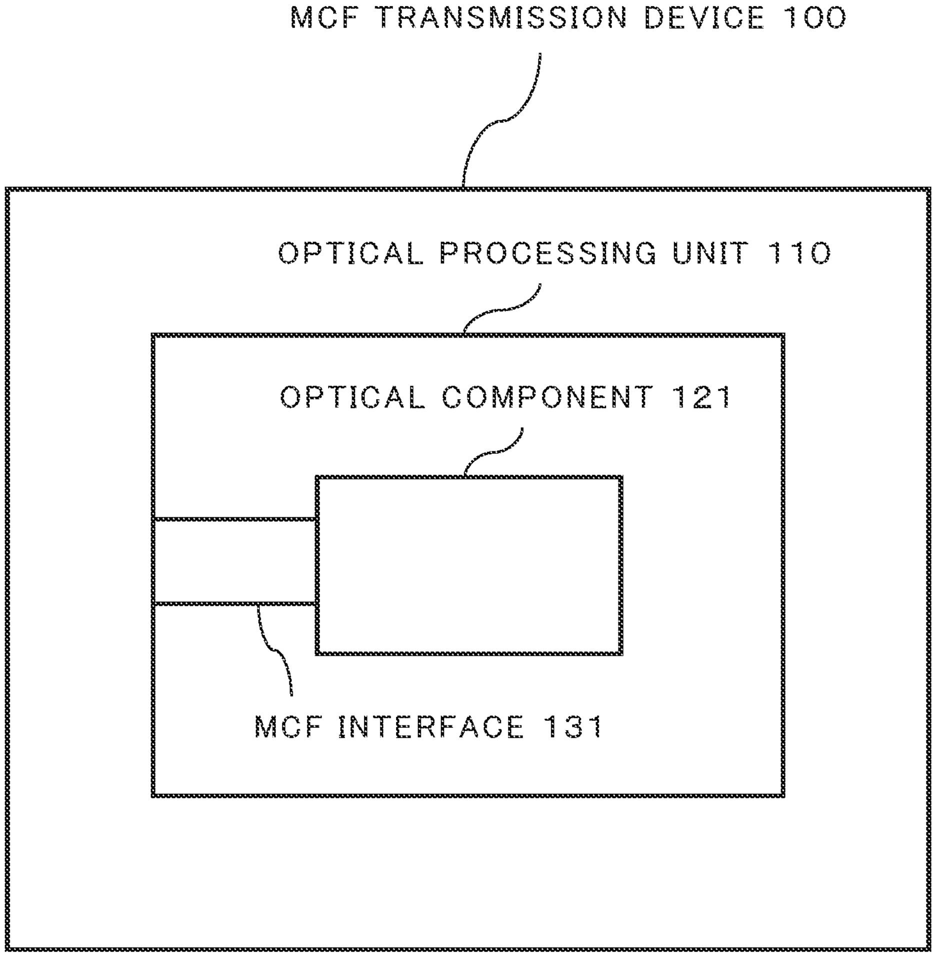
FIG. 1 is a block diagram illustrating a configuration example of an MCF transmission device 100.

With reference to the drawings, example embodiments of the present invention are described below. The directions of the arrows illustrated in the drawings are merely example, and are not intended to limit the directions indicated by the arrows. In each of the example embodiments and the drawings, elements that are previously described are denoted with identical names and reference symbols, and overlapping description is omitted.

First Example Embodiment

FIG. 1 is a block diagram illustrating a configuration example of a multicore fiber transmission device (hereinafter, referred to as an "MCF transmission device") 100 of the present invention. The MCF transmission device 100 is an optical transmission device being connected to the outside via an optical cable. For example, the optical cable is an optical fiber cable for connecting optical transmission devices laid on land or the sea floor. In other words, the optical transmission device 100 is used in an optical cable system on land or an optical cable system on the sea floor (submarine cable system). The optical cable includes a multicore fiber including a plurality of cores. The MCF transmission device 100 includes an optical component 121 and an MCF interface 131.

The MCF interface 131 is connected to the optical component 121. The MCF interface 131 is a multicore fiber including a plurality of cores, and can be fusion-spliced to an end portion of the multicore fiber of the optical cable for each core. For example, the MCF interface 131 is a pig tail fiber of the MCF being optically connected to the optical component 121. An optical processing unit 110 is an optical circuit including the optical component 121 and the MCF interface 131, and the optical processing unit 110 is one form of an optical processing means.

The optical component 121 executes predetermined processing on each piece of light coupled to a plurality of cores of a multicore fiber via the MCF interface 131. For example, the predetermined processing is attenuating, amplifying, splitting, coupling, filtering, wavelength multiplexing, and wavelength demultiplexing. However, the processing executed by the optical component 121 is not limited thereto. The optical component 121 executes the predetermined processing independently on each piece of light coupled to a plurality of cores of a multicore fiber connected to the MCF interface 131 from the outside of the MCF transmission device 100.

Figure 2:
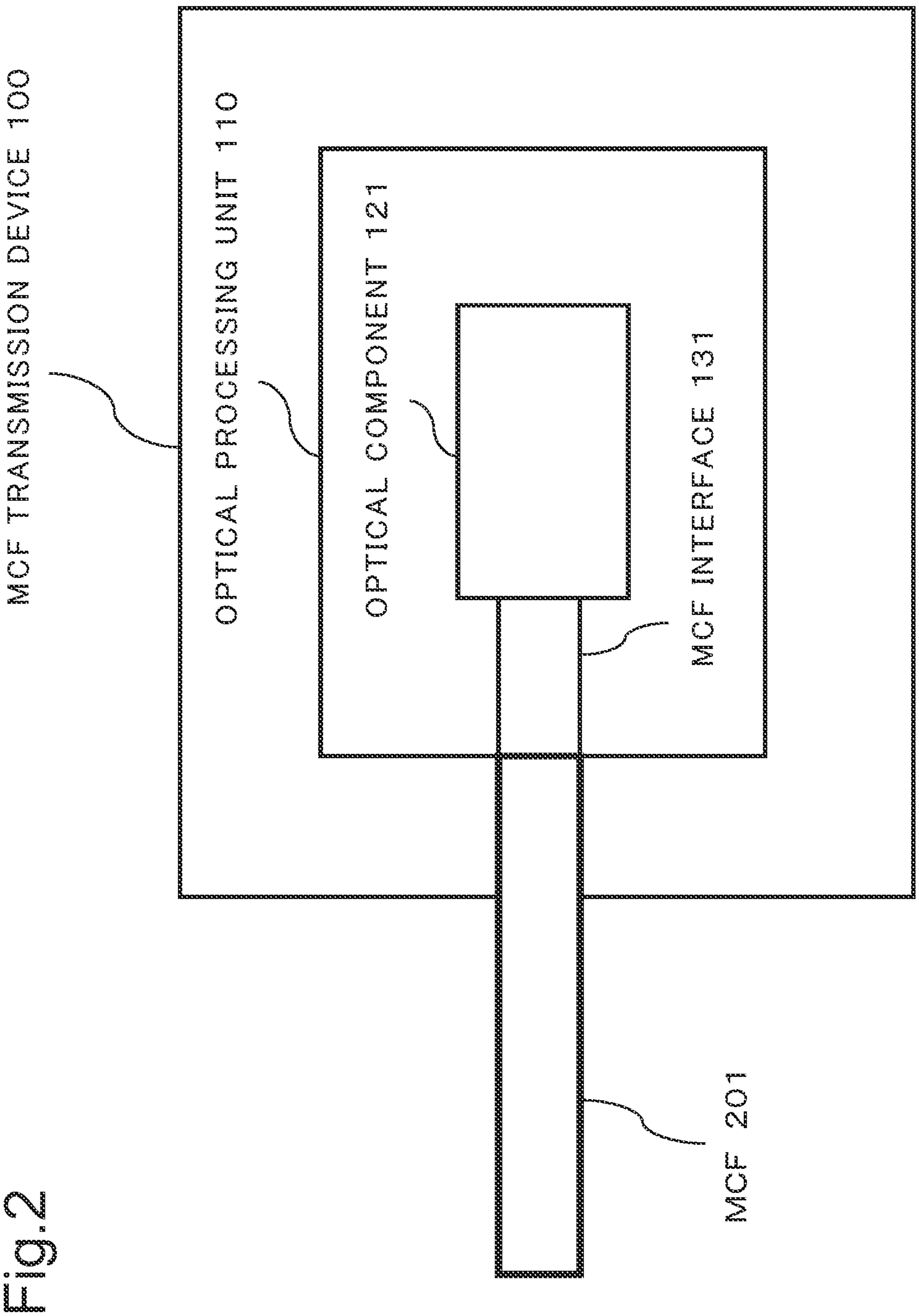
FIG. 2 is a block diagram illustrating a configuration example of the MCF transmission device 100 connected to an MCF 201.

FIG. 2 is a block diagram illustrating a configuration example of the MCF transmission device 100 connected to an MCF 201. The MCF 201 is a multicore fiber connected to the MCF interface 131 from the outside of the MCF transmission device 100. The optical component 121 executes the processing on the light being input to and output between the MCF transmission device 100 and the outside thereof via the MCF interface 131, for each piece of the light propagating through the cores of the MCF 201. For example, the optical component 121 executes the predetermined processing on each piece of the light propagating through the cores of the MCF 201, which is input from the MCF interface 131. Alternatively, the optical component 121 executes the predetermined processing on light generated by the optical component 121, and outputs the light to the MCF interface 131. The predetermined processing executed on the light input to or output from the MCF 201 may differ for each core associated with each piece of the light, or may be similar for some or all thereof.

The optical component 121 may be a plurality of light emission components or a plurality of light reception components that match in number with the cores of the MCF 201 and are arranged in parallel. In FIG. 2, the optical processing unit 110 may include an electric circuit being electrically connected to the optical component 121. For example, the electric circuit drives a light emission component to emit light. Alternatively, the electric circuit amplifies a reception light current output from a light reception component.

First Modification Example of First Example Embodiment

Figure 3:
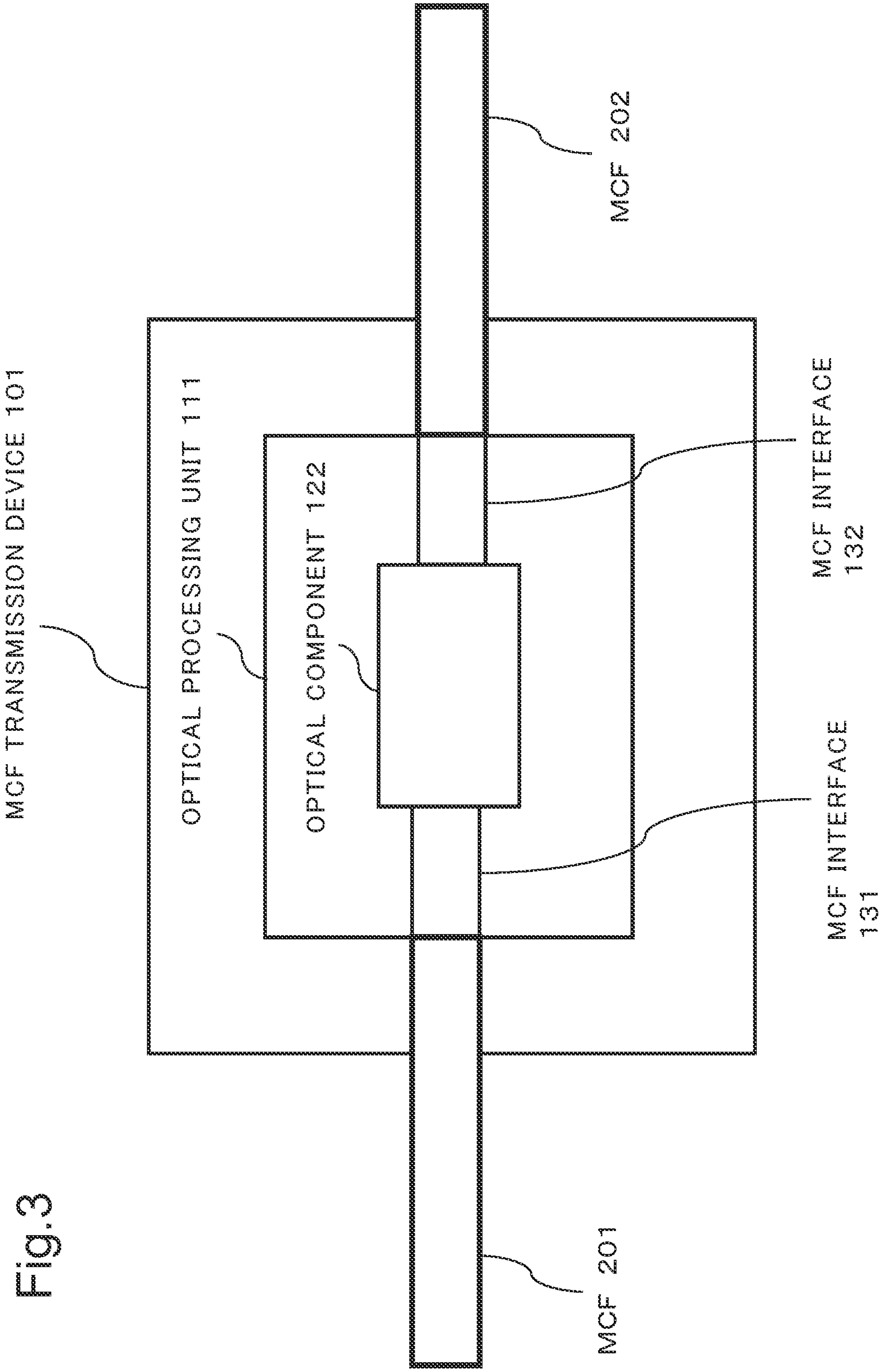
FIG. 3 is a block diagram illustrating a configuration example of the MCF transmission device 101 connected to MCFs 201 and 202.

FIG. 3 is a block diagram illustrating a configuration example of an MCF transmission device 101 connected to MCFs 201 and 202. The MCF transmission device 101 is a first modification example of the MCF transmission device 100. The MCF 201 is a multicore fiber connected to the MCF interface 131, and the MCF 202 is a multicore fiber connected to an MCF interface 132. An optical processing unit 111 is different from the optical processing unit 110 in FIG. 2 in that an optical component 122 includes the MCF interface 132.

The optical component 122 executes the processing on the light being input to and output between the MCF transmission device 101 and the outside thereof via at least one of the MCF interfaces 131 and 132, for each piece of the light propagating through the cores of the MCFs 201 and 202. For example, the optical component 122 executes the predetermined processing on each piece of the light propagating through the cores of the MCF 201, which is input from the MCF interface 131, and then outputs the light to the MCF interface 132. As the optical component 122, an optical switch, an optical amplifier, an optical attenuator, an optical filter, or an optical wave shaper may be used. The optical wave shaper is an optical component including a function of changing a wavelength band or intensity of input light.

For example, in the optical component 122, a plurality of optical switches are arranged in parallel. Each of the plurality of optical switches controls connection between each core of the MCF 201 and each core of the MCF 202. The optical processing unit 111 may include a control unit that sets a core of the MCF 202, which is an output destination for light input from each core of the MCF 201, to an optical switch.

For example, in the optical component 122, a plurality of variable optical attenuators are arranged in parallel. Each of the variable optical attenuators controls an attenuation amount between each core of the MCF 201 and each core of the MCF 202. The optical processing unit 111 may include a control unit that sets an attenuation amount for light input from each core of the MCF 201, to a variable optical attenuator.

Further, the optical component 122 may be an optical matrix switch. The optical matrix switch controls a connection relationship between each core of the MCF 201 and each core of the MCF 202. For example, each of the MCFs 201 and 202 and the MCF interfaces 131 and 132 include four cores, a 4×4 optical matrix switch may be used as the optical component 122. The optical matrix switch optically couples each core of the MCF interface 131 and the MCF interface 132, and connection between each of the MCF interface 131 and each core of the MCF interface 132 may be controlled externally.

Further, the number of cores of the MCF 201 and the MCF interface 131 may be M, and the number of cores of the MCF 202 and the MCF interface 132 may be N. In this case, as the optical component 122, an M×N optical matrix switch may be used. Herein, M and N are integers equal to or greater than two. M and N may be the same or different from each other. For example, the optical matrix switch may be achieved by LCOS including an MCF interface. The liquid crystal on silicon (LCOS) is an optical device that executes processing such as switching and filtering for light by using a liquid crystal.

Second Modification Example of First Example Embodiment

Figure 4:
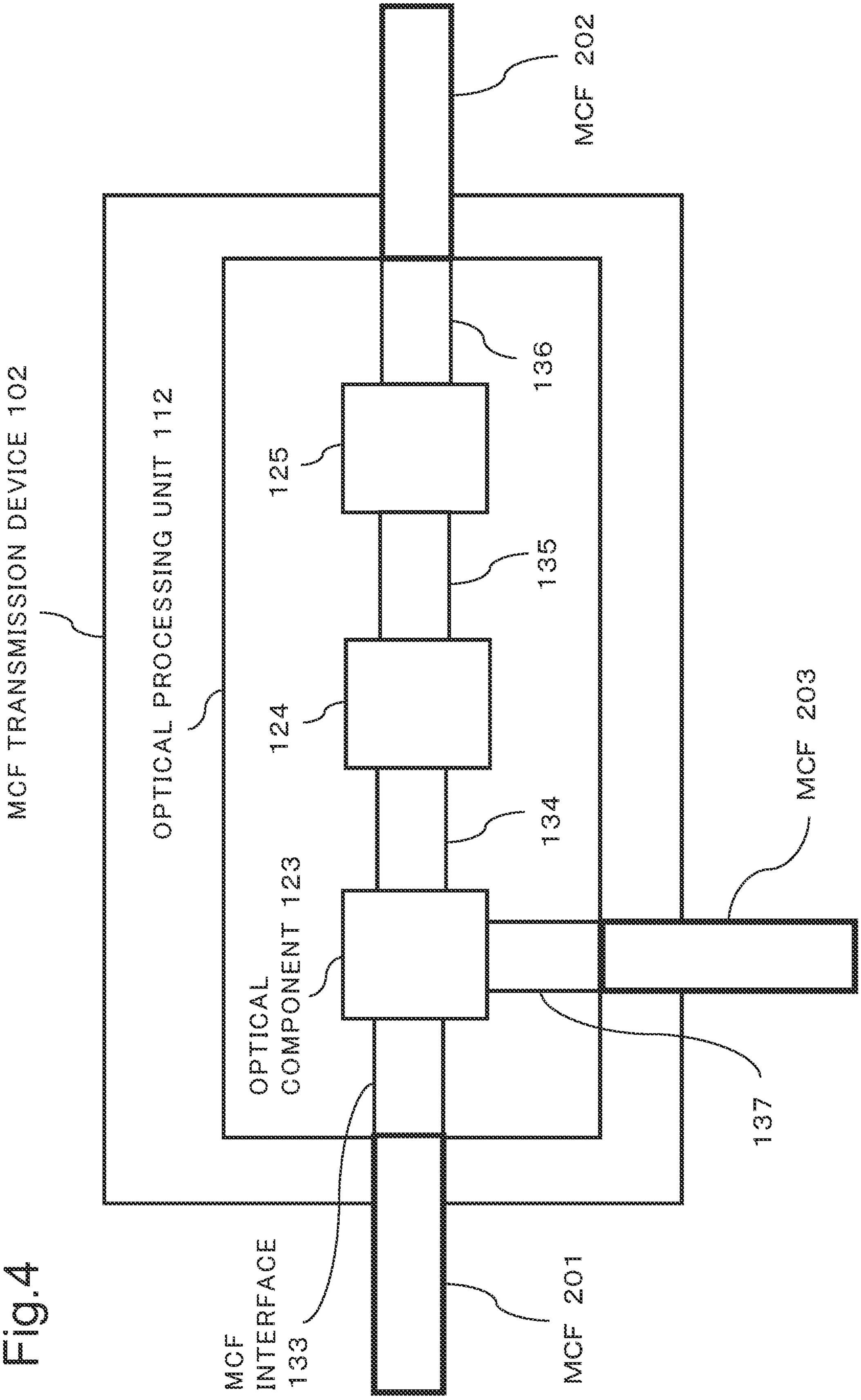
FIG. 4 is a block diagram illustrating a configuration example of an MCF transmission device 102.
Figure 5:
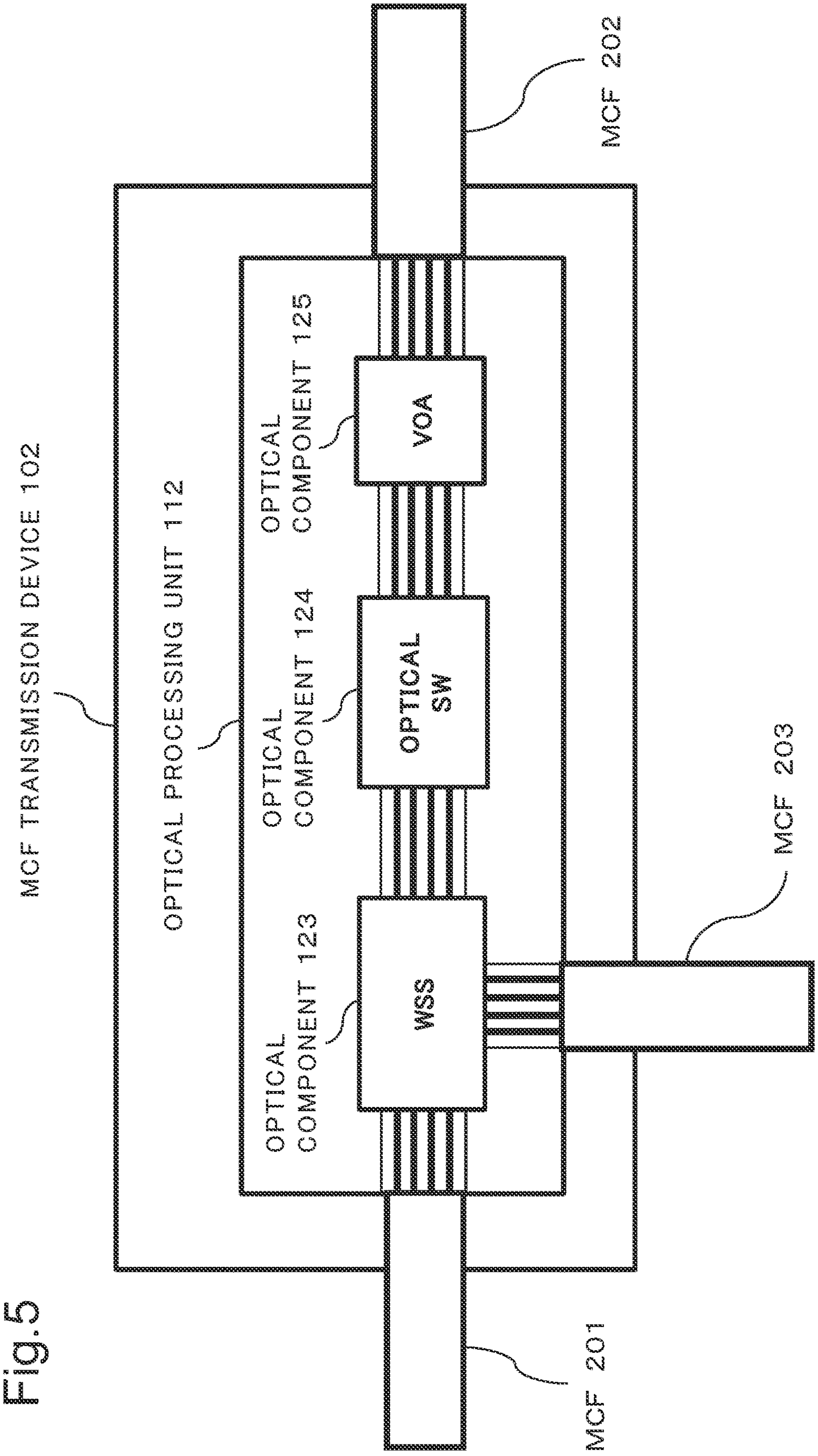
FIG. 5 is a block diagram illustrating a specific configuration example of the MCF transmission device 102.

FIG. 4 is a block diagram illustrating a configuration example of an MCF transmission device 102 connected to MCFs 201 to 203. FIG. 5 is a block diagram illustrating a more specific configuration example of the MCF transmission device 102. The MCF transmission device 102 is a second modification example of the MCF transmission device 100.

In FIG. 4, an optical processing unit 112 of the MCF transmission device 102 includes optical components 123 to 125. The optical component 123 is connected to the MCFs 201 and 203 via MCF interfaces 133 and 137, respectively. The optical component 123 and the optical component 124 are connected to each other via an MCF interface 134. The optical component 124 and the optical component 125 are connected to each other via an MCF interface 135. The optical component 125 is connected to the MCF 202 via an MCF interface 136. The optical component 123 and the optical component 124, and the optical component 124 and the optical component 125 may be connected to each other by fusion-splicing the MCF interfaces of the optical components to each other.

As illustrated in FIG. 5, for example, the optical component 123 is a wavelength selective switch (WSS), the optical component 124 is an optical switch (optical SW), and the optical component 125 is a variable optical attenuator (VOA).

As illustrated in FIG. 1 to FIG. 4, the MCF transmission devices 100 to 102 include the MCF interfaces 131 to 137, and thus the external multicore fiber and the optical processing units 110 to 112 can be connected directly to each other without using a FIFO. Therefore, a manufacturer of an optical transmission device is not required to prepare a FIFO at the time of manufacturing an optical transmission device applied to an optical transmission system using an MCF. As a result, the MCF transmission devices 100 to 102 according to the present example embodiment exert an effect of facilitating connection between the multicore fiber and the optical transmission device. Further, with this, manufacturing of the optical transmission devices 100 to 102 is facilitated.

In the present example embodiment, description is made on an example in which the MCF transmission device is connected to the four-core multicore fiber. However, the number of cores of the multicore fiber is not limited to four. In the present example embodiment and the following example embodiments to which the configuration of the present example embodiment is applicable, the number of cores of an MCF interface and a configuration of an optical component can be selected according to the number of cores of a multicore fiber connected to an MCF transmission device. In such a case, an effect of facilitating connection between an MCF transmission device and a multicore fiber can be exerted regardless of the number of cores of the multicore fiber connected from the outside of the MCF transmission device.

Second Example Embodiment

Figure 6:
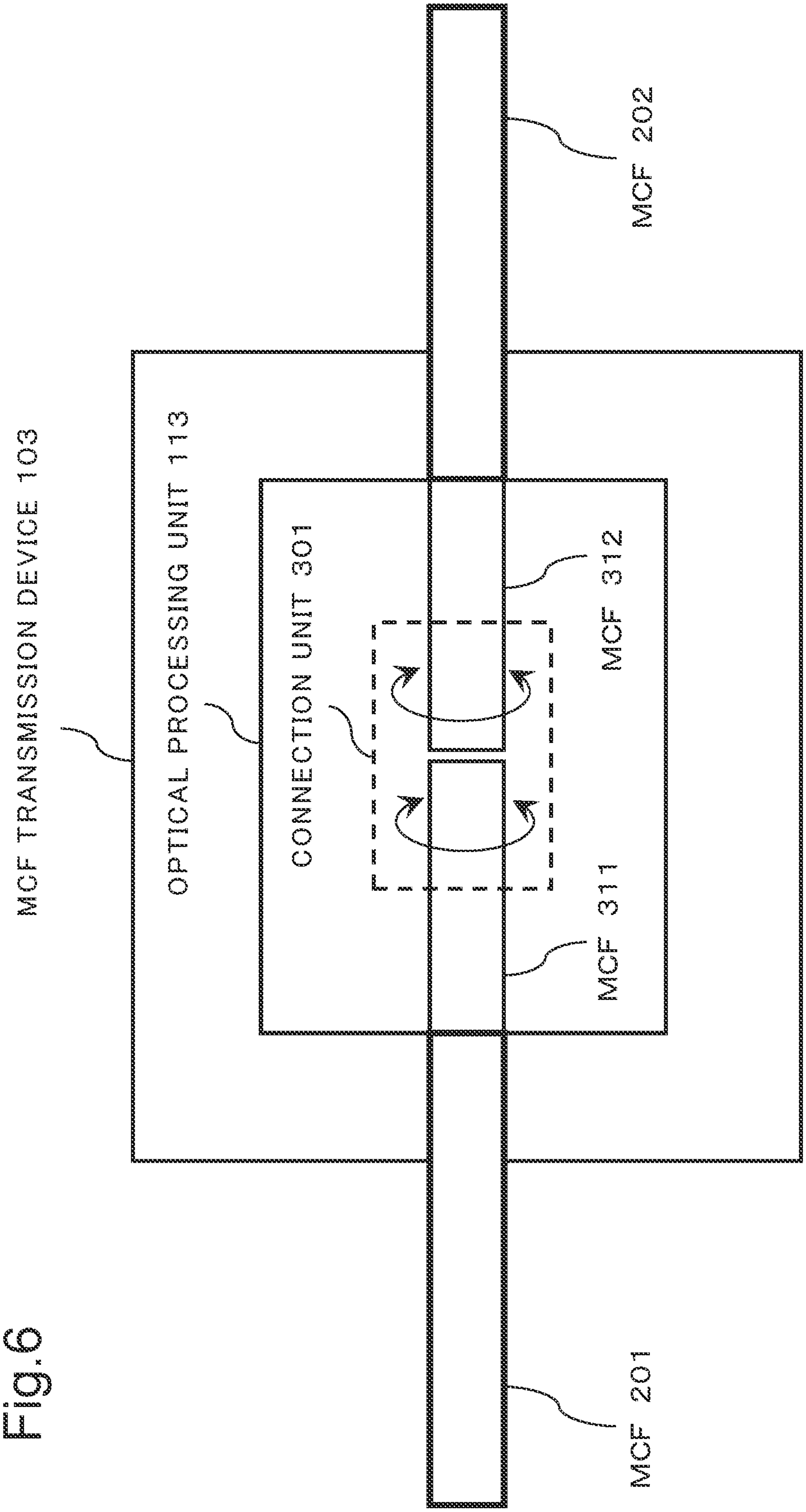
FIG. 6 is a block diagram illustrating a configuration example of an MCF transmission device 103.

FIG. 6 is a block diagram illustrating a configuration example of an MCF transmission device 103 according to a second example embodiment of the present invention. The MCF transmission device 103 includes an optical processing unit 113. The optical processing unit 113 includes MCFs 311 and 312 and a connection unit 301. The MCF 311 is a multicore fiber connected to the MCF 201, and the MCF 312 is a multicore fiber connected to the MCF 202. The connection unit 301 causes a cross section of the MCF 311 and a cross section of the MCF 312 to approach each other, and directly connects the cores of both the MCFs to each other. Such connection is also referred to as butt joint. Due to the connection unit 301, some or all of the cores of the MCF 201 and some or all of the cores of the MCF 202 can optically be connected to each other. The connection unit 301 according to the present example embodiment is associated with the optical component 122 in FIG. 3. Further, the MCFs 311 and 312 include the functions of the MCF interfaces 131 and 132 in FIG. 3, respectively.

As the connection unit 301, a general rotary joint for an optical fiber may be used. The rotary joint includes a mechanism that rotates one or both of two optical fibers connected to each other through butt joint on one center axis, about the center axis.

Figure 7:
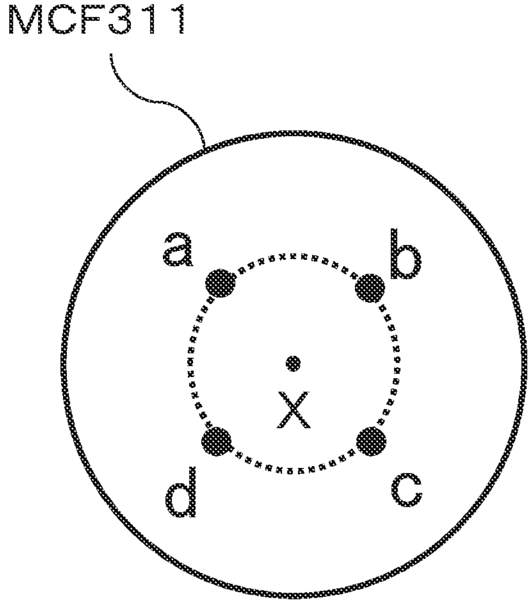
FIG. 7 is a diagram illustrating an example of a cross section of an MCF 311.

FIG. 7 is a diagram illustrating an example of the cross section of the MCF 311. The cross section of the MCF 311 has a circular shape, and the MCF 311 includes four cores a to d. The cores a to d are arranged at an equal interval on a circle of the cross section of the MCF 311 having a center axis X as a center. In other words, a distance between the core a and the core b, a distance between the core b and the core c, a distance between the core c and the core d, and a distance between the core d and the core a are equal to one another. In this case, an angle formed between two adjacent cores with respect to the center axis X is 90 degrees. The MCF 312 is also a multicore fiber having a cross section similar to that of the MCF 311.

FIG. 8A to FIG. 8C, FIG. 9A and FIG. 9B, and FIG. 10A and FIG. 10B are diagrams for describing examples of connection between the cores of the MCF 311 and the cores of the MCF 312 in the connection unit 301. Those diagrams schematically illustrate the cross sections of the MCFs 311 and 312 in the connection unit 301. In other words, in those diagrams, the alignment order of the cores a to d of the MCF 312 is reverse to the alignment order of the cores a to d of the MCF 311.

Figure 8A:
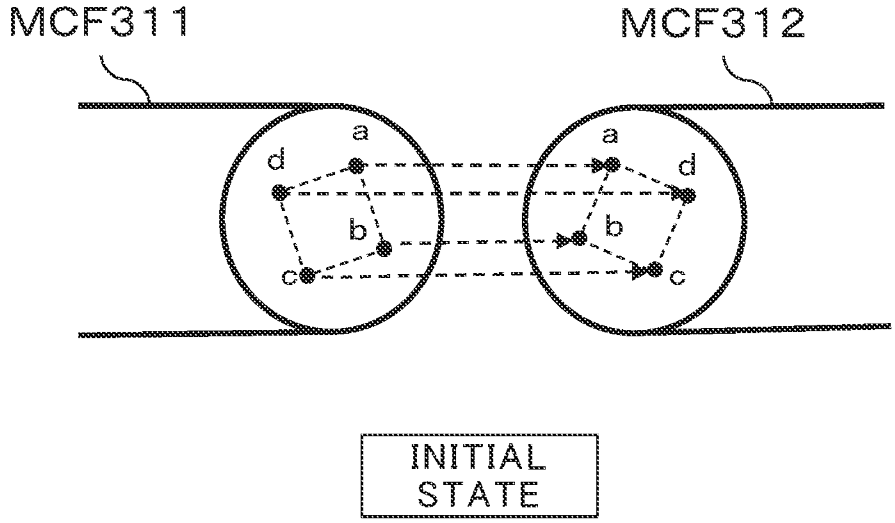
FIG. 8A is a diagram for describing an example of connection between cores of the MCF 311 and cores of an MCF 312.
Figure 8B:
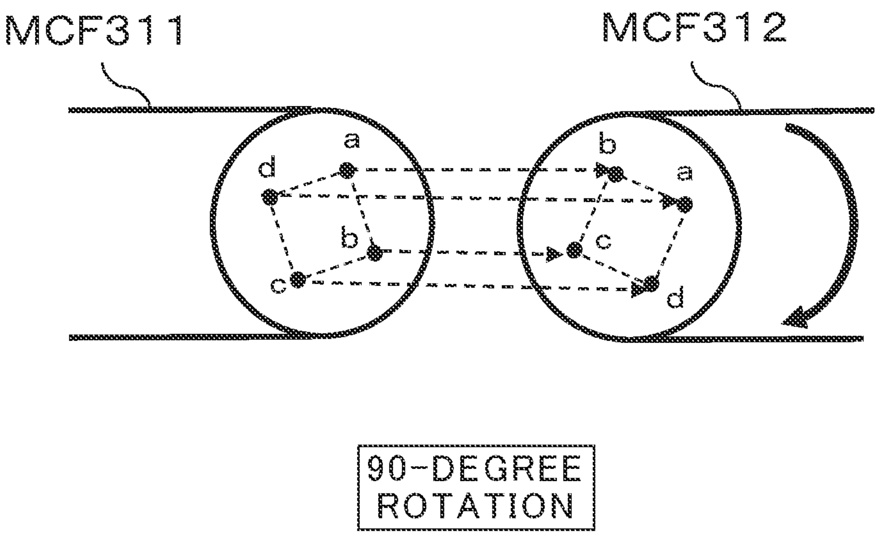
FIG. 8B is a diagram for describing an example of connection between the cores of the MCF 311 and the cores of the MCF 312.
Figure 8C:
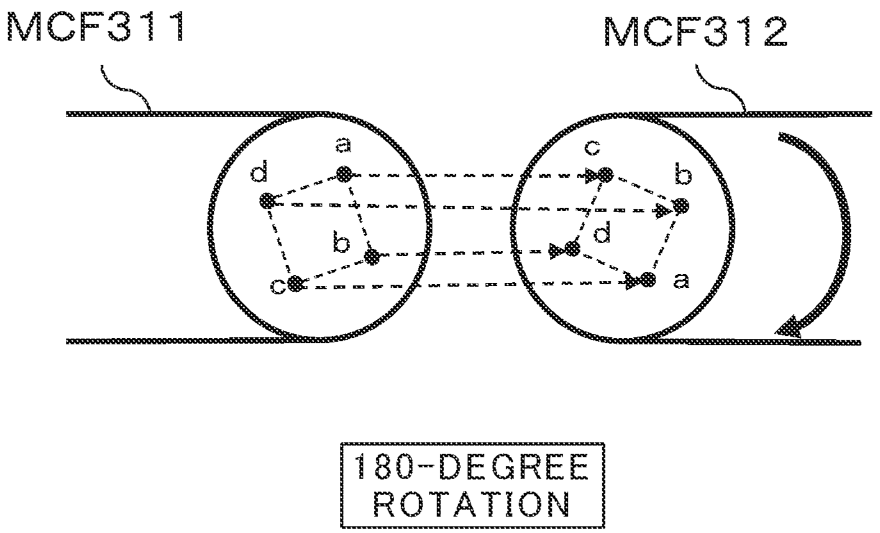
FIG. 8C is a diagram for describing an example of connection between the cores of the MCF 311 and the cores of the MCF 312.

FIG. 8A illustrates an example of an initial state of a position relationship between the cores of the MCF 311 and the cores of the MCF 312 in the connection unit 301. The cores a to d of the MCF 311 are coupled to the cores a to d of the MCF 312, respectively. FIG. 8B illustrates an example in which the connection unit 301 rotates the MCF 312 about the center axis from the initial state (a rotation amount of 0 degrees) by 90 degrees in the arrow direction. Such rotation can be performed by controlling a rotation amount of a rotary joint. In FIG. 8B, the cores a, b, c, and d of the MCF 311 are coupled to the cores b, c, d, and a of the MCF 312, respectively. FIG. 8C illustrates a case in which the connection unit 301 rotates the MCF 312 about the center axis from the initial state by 180 degrees in the arrow direction. In FIG. 8C, the cores a, b, c, and d of the MCF 311 are coupled to the cores c, d, a, and b of the MCF 312, respectively. Similarly, when the MCF 312 is rotated about the center axis from the initial state by 270 degrees in the arrow direction, the cores a, b, c, and d of the MCF 311 are coupled to the cores d, a, b, and c of the MCF 312, respectively. Therefore, when the MCFs 311 and 312 are multicore fibers each including four cores, the optical processing unit 113 can be caused to function as an optical switch by rotating the MCF 312 by a 90-degree step.

In this manner, in the MCF transmission device 103 according to the second example embodiment, the optical processing unit 113 can function as an optical switch.

First Modification Example of Second Example Embodiment

Figure 9A:
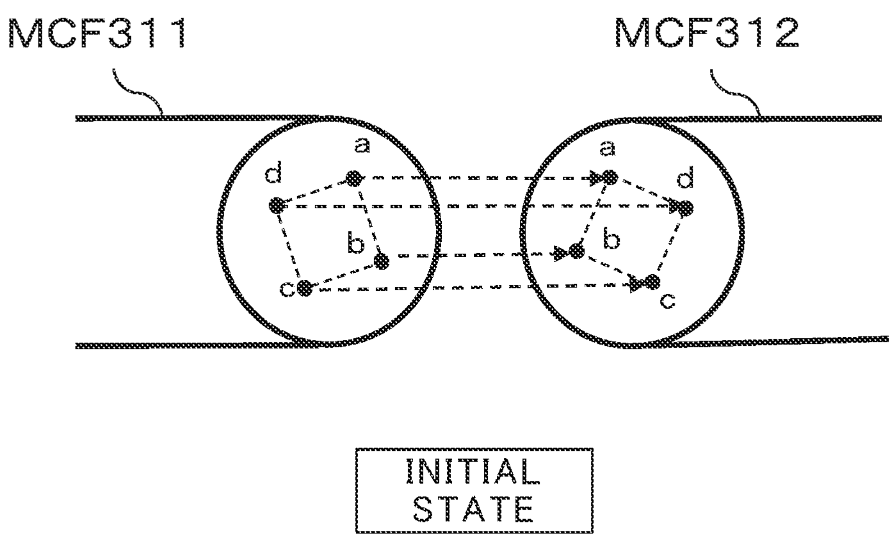
FIG. 9A is a diagram for describing an example in which a rotation amount of the MCF 312 is 45 degrees.
Figure 9B:
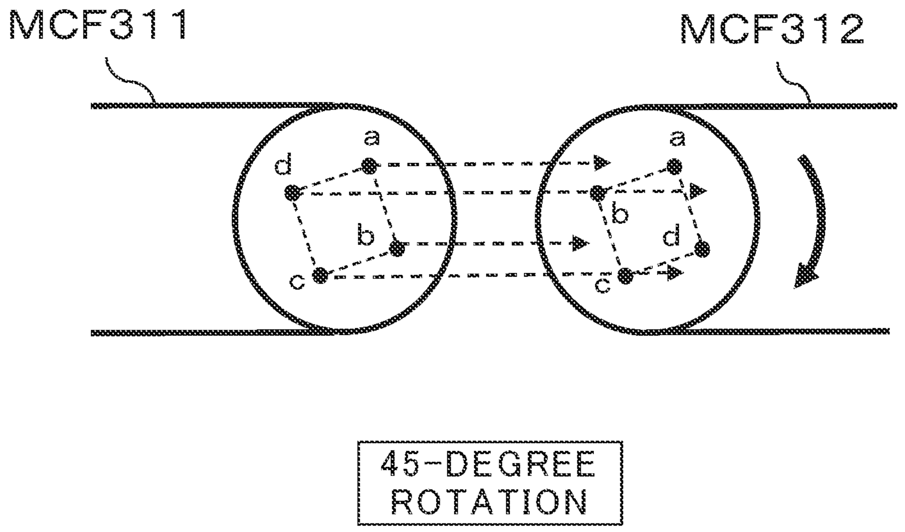
FIG. 9B is a diagram for describing an example in which the rotation amount of the MCF 312 is 45 degrees.

FIG. 9A and FIG. 9B illustrate an example in which the rotation amount of the MCF 312 is 45 degrees at a time instead of 90 degrees in the MCF transmission device 103 illustrated in FIG. 6. FIG. 9A illustrates an initial state before rotation in which, similarly to FIG. 8A, the cores a to d of the MCF 311 are coupled to the cores a to d of the MCF 312, respectively. FIG. 9B illustrates a case in which the connection unit 301 rotates the MCF 312 about the center axis from the initial state by 45 degrees. At a position at which the MCF 312 is rotated from the initial state by 45 degrees, the positions of the cores a to d of the MCF 312 are significantly deviated from the positions of the cores a to d of the MCF 311, and the cores a to d of the MCF 311 are not optically coupled to any of the cores a to d of the MCF 312. In other words, the optical processing unit 113 can be caused to function as an optical shutter by rotating the MCF 312 from the initial state by an angle at which each core of the MCF 311 and each core of the MCF 312 are not optically coupled to each other (for example, 45 degrees, 135 degrees, or 225 degrees). The optical shutter is an optical component capable of controlling transmission or blocking of light. Further, an effect exerted by an optical switch, which is similar to FIG. 8B, can also be exerted by rotating the MCF 312 further from the state in FIG. 9B by 45 degrees. Therefore, when the MCFs 311 and 312 are multicore fibers each including four cores illustrated in FIG. 7, the optical processing unit 113 can be caused to function as an optical switch and an optical shutter by rotating the MCF 312 from the initial state by a 45-degree step.

Second Modification Example of Second Example Embodiment

Figure 10A:
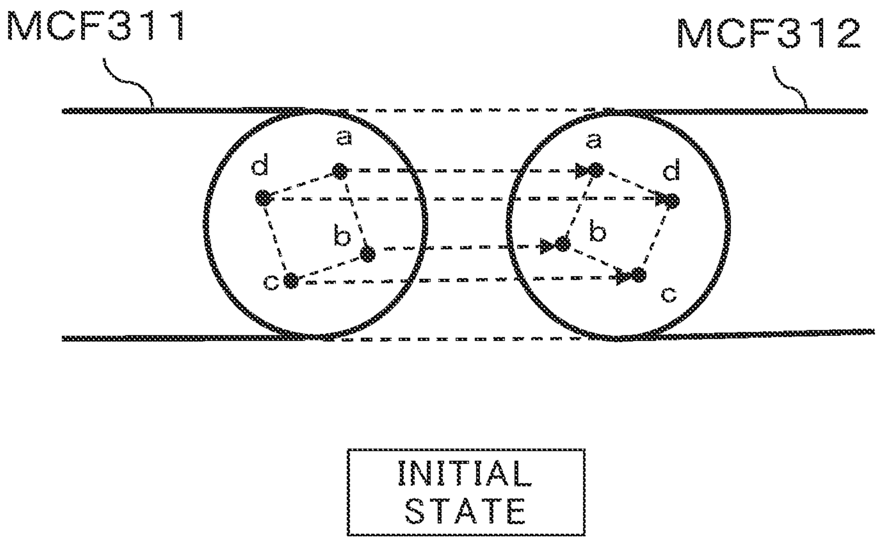
FIG. 10A is a diagram for describing an example in which the rotation amount of the MCF 312 is further reduced.
Figure 10B:
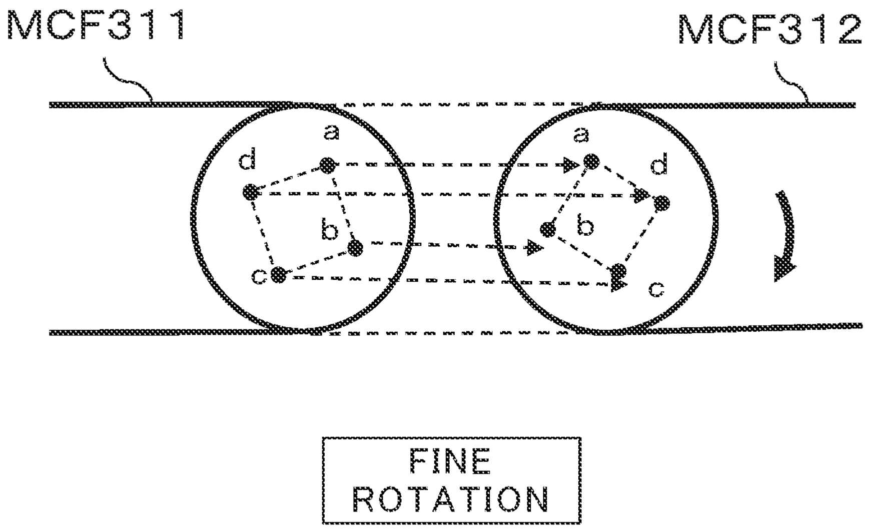
FIG. 10B is a diagram for describing an example in which the rotation amount of the MCF 312 is further reduced.

FIG. 10A and FIG. 10B illustrate an example in which the rotation amount of the MCF 312 is significantly reduced in the MCF transmission device 103 illustrated in FIG. 6. FIG. 10A illustrates an initial state before rotation in which, similarly to FIG. 8A and FIG. 9A, the cores a to d of the MCF 311 are coupled to the cores a to d of the MCF 312, respectively. FIG. 10B illustrates a case in which the connection unit 301 finely rotates the MCF 312 about the center axis. In FIG. 10B, at a position at which the MCF 312 is finely rotated from the initial state, the optical axes of the cores a to d of the MCF 311 and the optical axes of the cores a to d of the MCF 312 do not match with each other. However, a deviation amount between the optical axes of the cores a to d of the MCF 311 and the cores a to d of the MCF 312 is slight. Thus, in FIG. 10B, which is different from 9B, a coupling loss between the cores a to d of the MCF 311 and the cores a to d of the MCF 312 is increased, but optical connection therebetween is not blocked. In other words, the cores a to d of the MCF 311 and the cores a to d of the MCF 312 are optically coupled in a loose manner. Further, the coupling loss between the MCF 311 and the MCF 312 is minimum before rotating the MCF 312 (in the initial state). Further, the axial deviation amount between the cores is increased as the MCF 312 is rotated, and hence the coupling loss is initially increased as the rotation amount of the MCF 312 is increased. Further, when the rotation amount arrives at an angle at which optical coupling between the cores of the MCF 311 and the cores of the MCF 312 that initially face each other is blocked, the coupling loss is maximum. Therefore, the optical processing unit 113 can be caused to function as a variable optical attenuator (VOA) by finely controlling the rotation amount of the MCF 312. Such a variable optical attenuator is capable of adjusting an attenuation amount of light propagating between each core of the MCF 311 and each core of the MCF 312, by controlling the rotation amount of the MCF 312. Any one of the functions as an optical switch, an optical shutter, and a variable optical attenuator that are described in FIG. 8A to FIG. 8C, FIG. 9A and FIG. 9B, and FIG. 10A and FIG. 10B can be acquired by rotating the MCF 312 about the center axis. Therefore, the optical processing unit 113 can achieve any one of the functions as an optical switch, an optical shutter, and a variable optical attenuator, by controlling the rotation amount of the MCF 312.

As described above, the MCF transmission device 103 according to the second example embodiment can achieve the functions as an optical switch, an optical shutter, and a variable optical attenuator, by causing the MCF 311 and the MCF 312 to face each other and rotating the MCF 312 about the center axis. Further, the MCF 311 and the MCF 312 can easily be connected to each other by using the MCF 201, the MCF 202, and a general multicore fiber fusion device. As a result, the MCF transmission device 103 is capable of facilitating connection between the MCFs 201 and 202, and the MCF transmission device 103 including the optical processing unit 113.

In the present example embodiment, description is made on the operation as an optical switch and the like, by using the multicore fiber including four cores illustrated in FIG. 7. However, the number of cores of the MCFs 311 and 312 is not limited to four. When the cores are arranged at an equal interval on the circle having the center axis as a center (in other words, all the angles formed between two adjacent cores on the circle with respect to the center axis are equal to each other), the connection unit 301 can function similarly to the present example embodiment. In such a multicore fiber, the plurality of cores of the MCF 311 are arranged at an equal interval on the circle having the center axis X of the MCF 311 as a center. Further, the MCF 312 has core arrangement similar to that of the MCF 311.

For example, the MCFs 311 and 312 may be a six-core multicore fiber in which six cores are arranged at an equal interval on a circle having the center axis X as a center. In this case, an angle formed by two adjacent cores with respect to the center axis X is 60 degrees. When such multicore fibers are used as the MCFs 311 and 312, the function as an optical switch can be acquired by rotation from the initial state at a 60-degree step, and the function as an optical shutter can be acquired by rotation by 30 degrees at a time.

Third Example Embodiment

Description is made on a case in which the optical component 123 illustrated in FIG. 4 is a wavelength selective switch (WSS).

Figure 11:
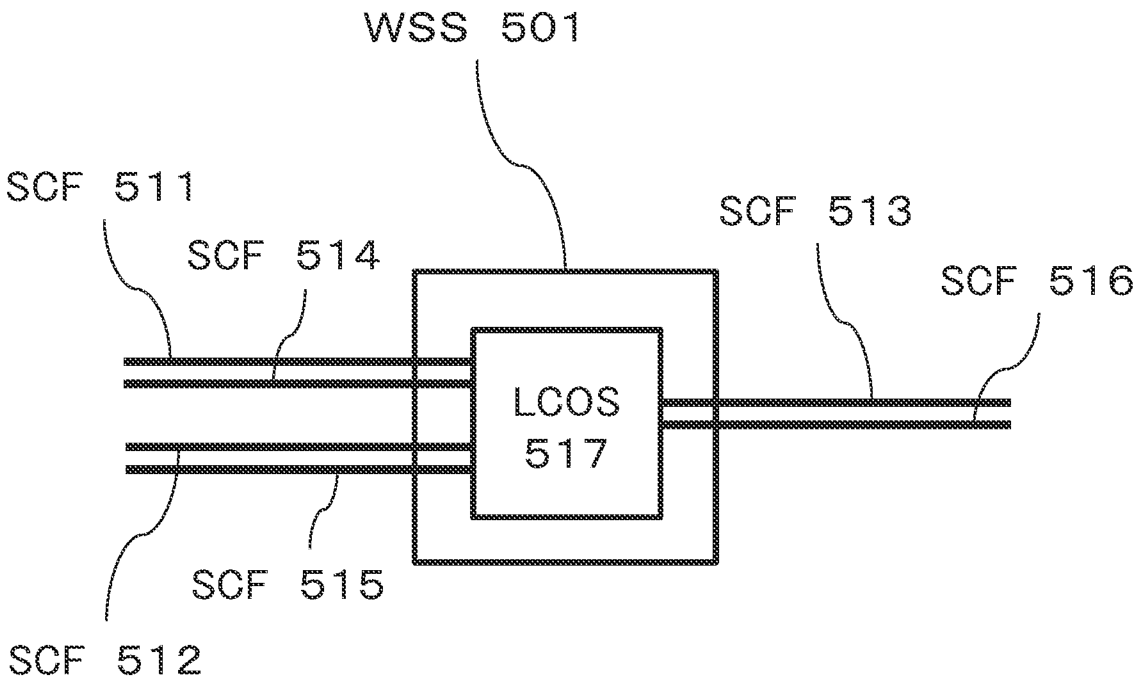
FIG. 11 is a diagram illustrating a configuration example of a WSS 501.

FIG. 11 is a diagram illustrating a configuration example of a WSS 501. The WSS 501 includes a function as a WSS including two sets of two inputs and one output, which are six single core fibers (SCFs 511 to 516). The WSS 501 includes one liquid crystal on silicon (LCOS) 517. The LCOS is an optical device that executes processing such as switching and filtering of light by causing light to enter a silicon substrate including a liquid crystal layer and using reflection or refraction of the light. The WSS 501 functions as a first WSS including the SCFs 511 to 513 as inputs and an output and a second WSS including the SCFs 514 to 516 as inputs and an output. The first WSS and the second WSS are independently operated.

Figure 12:
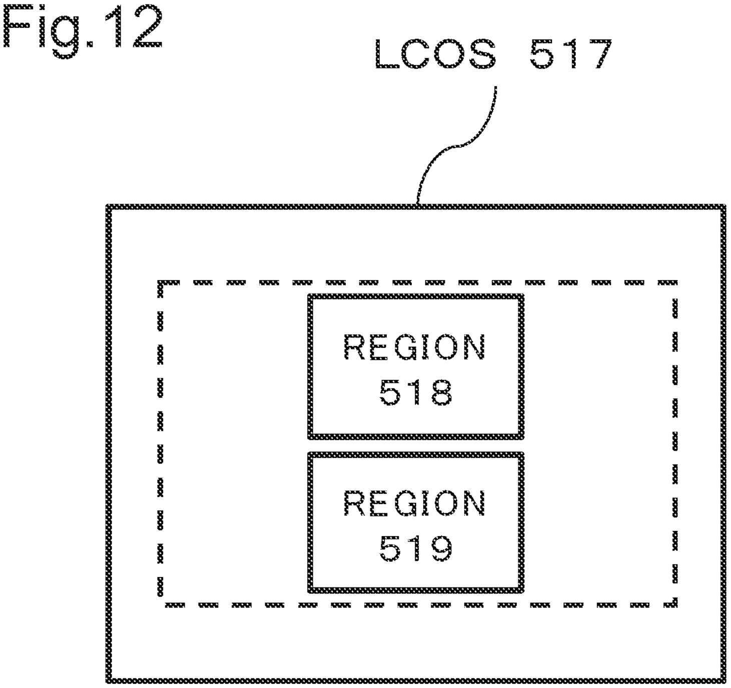
FIG. 12 is a diagram illustrating an allocation example of a use region of a surface of an LCOS 517.

FIG. 12 is a diagram illustrating an allocation example of a use region of a surface of the LCOS 517 included in the WSS 501. A region surrounded by the broken line indicates an example of a region in which the LCOS 517 can subject light to processing. A region 518 is optically coupled to the SCFs 511 to 513, and light being input and output between the SCFs 511 to 513 and the WSS 501 is subjected to processing. A region 519 is optically coupled to the SCFs 514 to 516, and light being input and output between the SCFs 514 to 516 and the WSS 501 is subjected to processing. The processing region is divided in this manner inside the LCOS 517, and thus the LCOS 517 can provide the functions as two independent WSSs.

Figure 13:
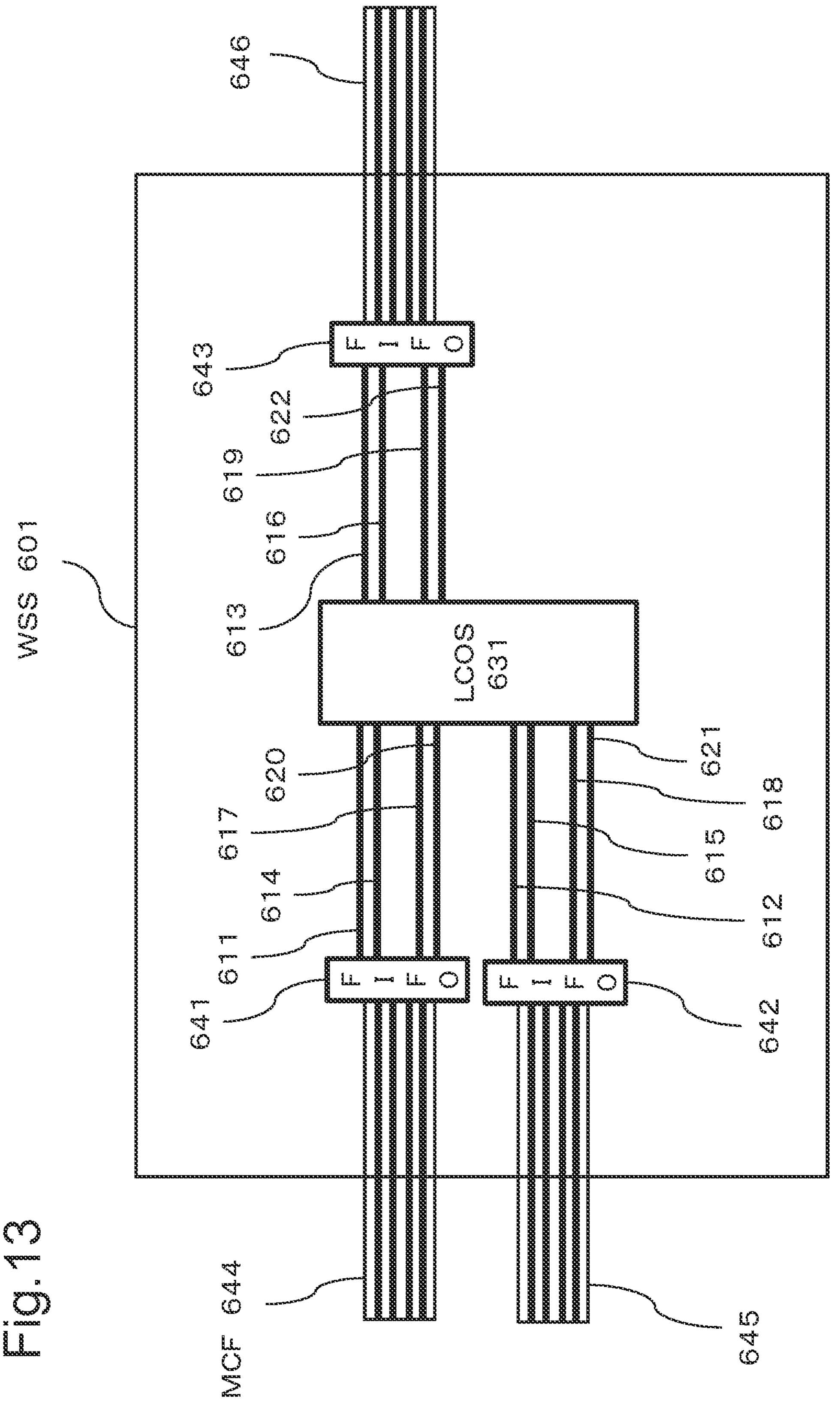
FIG. 13 is a diagram illustrating a configuration example of a WSS 601.

FIG. 13 is a diagram illustrating a configuration example of a WSS 601. The WSS 601 includes a function as a WSS including four sets of two inputs and one output. The WSS 601 includes one LCOS 631. The LCOS 631 is an optical device that executes processing such as switching and filtering of light by using a liquid crystal, and includes 12 single core fibers (SCF 611 to 622) as inputs and outputs. The LCOS 631 functions as a first WSS including the SCFs 611 to 613 as inputs and an output, a second WSS including the SCFs 614 to 616 as inputs and an output, a third WSS including the SCFs 617 to 619 as inputs and an output, and a fourth WSS including the SCFs 620 to 622 as inputs and an output. The first to fourth WSSs are independently operated. In other words, the WSS 601 includes the functions equivalent to two WSSs 501 described in FIG. 11.

The WSS 601 includes FIFOs 641 to 643 and the MCFs 644 to 646. Each of the MCFs 644 to 646 is a four-core multicore fiber. The FIFO 641 connects the cores of the MCF 644, and the SCF 611, 614, 617, and 620 to each other. The FIFO 642 connects the cores of the MCF 645, and the SCFs 612, 615, 618, and 621 to each other. The FIFO 643 connects the cores of the MCF 646, and the SCF 613, 616, 619, and 622 to each other. The MCFs 644 to 646 function as the MCF interfaces described in the first example embodiment.

The optical processing unit described in the first and the second example embodiments may be configured by using the WSS 601. For example, the WSS 601 may be used as an optical processing unit including the optical component 123, and the MCF interfaces 133, 134, and 137 that are described in FIG. 4. In this case, the MCFs 644 to 646 function as the MCF interfaces 133, 137, and 134 in FIG. 4. The MCF 644 is fusion-spliced to the MCF 201, and the MCF 645 is fusion-spliced to the MCF 203. Further, the MCF 646 is connected to the optical component 124 via the MCF interface 134.

Figure 14:
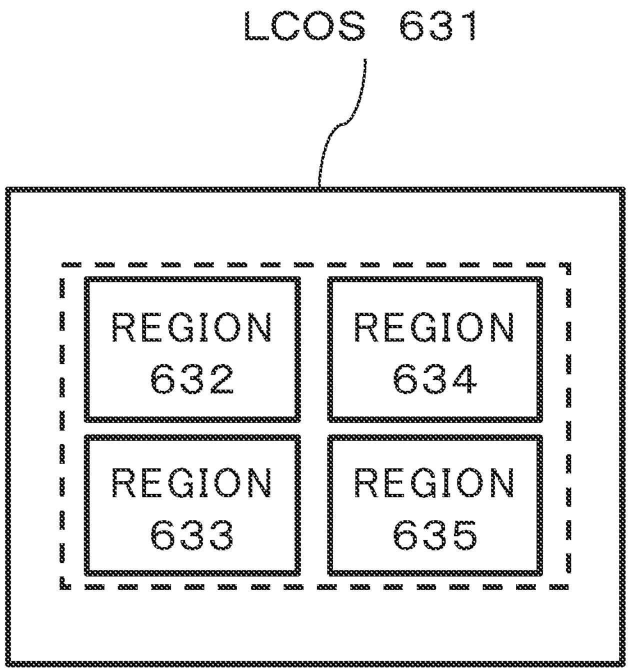
FIG. 14 is a diagram illustrating an allocation example of a use region of a surface of an LCOS 631.

FIG. 14 is a diagram illustrating an allocation example of a use region of a surface of the LCOS 631. A region surrounded by the broken line indicates an example of a region in which the LCOS 631 can subject light to processing. The LCOS 631 being one LCOS can use four regions 632 to 635 while using the same optical device as the LCOS 517, by rearranging the region of the LCOS 517 illustrated in FIG. 12.

The region 632 is optically coupled to the SCFs 611 to 613 in FIG. 13, and light being input and output between the SCFs 611 to 613 and the LCOS 631 is subjected to processing. The region 633 is optically coupled to the SCFs 614 to 616, and light being input and output between the SCFs 614 to 616 and the LCOS 631 is subjected to processing. The region 633 is optically coupled to the SCFs 617 to 619, and light being input and output between the SCFs 617 to 619 and the LCOS 631 is subjected to processing. The region 634 is optically coupled to the SCFs 620 to 622, and light being input and output between the SCF 620*s* to 622 and the LCOS 631 is subjected to processing. In this manner, the LCOS 517 can provide the functions as four independent WSSs.

The MCFs 644 to 646 can be used as MCF interfaces, and hence the WSS 601 thus configured can facilitate connection with another multicore fiber. Therefore, when the WSS 601 is mounted to an optical transmission device, connection with a multicore fiber connected to the outside of the optical transmission device or another optical processing unit including an MCF interface is facilitated. In other words, with the WSS 601, the multicore fiber and the optical transmission device can easily be connected to each other at the time of manufacturing the optical transmission device.

The number of cores of the MCFs 644 to 646 is not limited to four. For example, the WSS 601 is applicable to an MCF transmission device including a larger number of cores, by MCFs each including five or more cores as the MCFs 644 to 646 and using an LCOS including five or more use regions.

Fourth Example Embodiment

Figure 15:
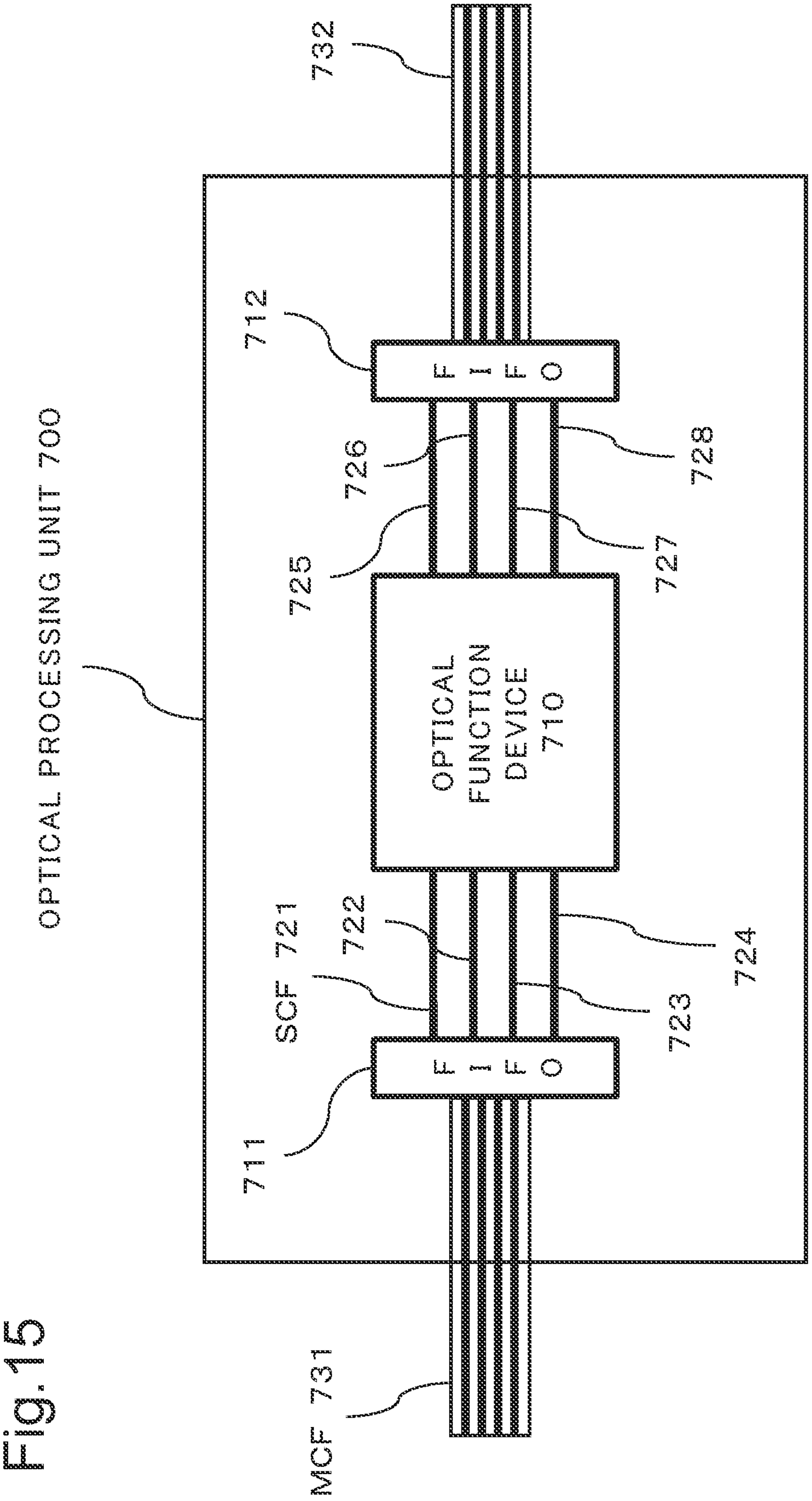
FIG. 15 is a block diagram illustrating a configuration example of an optical processing unit 700.

The configuration of the WSS 601 illustrated in FIG. 13 can also be modified and applied to an optical processing unit including another function. FIG. 15 is a block diagram illustrating a configuration example of an optical processing unit 700 according to a fourth example embodiment. The optical processing unit 700 includes an optical function device 710 including four sets of inputs and outputs, FIFOs 711 and 712, MCFs 731 and 732, and SCFs 721 to 728. The optical processing unit 700 is one aspect of the optical processing unit 111 illustrated in FIG. 3.

In the present example embodiment, each of the MCFs 731 and 732 is a four-core multicore fiber. The SCFs 721 to 728 are single core fibers. The FIFO 711 connects each core of the MCF 731 and each core of the SCFs 711 to 724 to each other. The FIFO 712 connects each core of the MCF 732 and the SCFs 725 to 728 to each other. The MCFs 731 and 732 are also used as the MCF interfaces 131 and 132 described in FIG. 3.

The optical function device 710 processes light input from the SCFs 721 to 724, and outputs the processed light to the SCFs 725 to 728. For example, the optical function device 710 is an optical wave shaper including four sets of inputs and outputs or four active optical filters being arranged in parallel. The optical wave shaper is an optical device including a function of changing a wavelength band or intensity of input light. The active optical filter is an optical device capable of dynamically controlling a transmittance property of a spectrum of input light. The wave shaper and the active optical filter may be achieved by the LCOS 631 including the four regions 632 to 635. In this case, in the four regions 632 to 635, light input from the SCFs 711 to 714 is independently subjected to processing. Further, the light processed in each region is output to each of the SCFs 725 to 728.

Alternatively, the optical function device 710 may be configured by a light reception component such as an optical coupler, an optical isolator, and a passive optical filter. For example, the optical function device 710 may be a 4×4 optical star coupler. In this case, of two 4×4 optical star couplers in four ways, one set may be connected to the SCFs 721 to 724, and the other set may be connected to the SCFs 725 to 728. Further, the optical coupler may be two 2×2 optical couplers.

Further, the optical function device 710 may be four optical isolators arranged in parallel. In this case, light propagating through the SCFs 721 to 724 passes through optical isolators different from one another, and is output to the SCFs 725 to 728. The passing direction of the light in the four optical isolators may not be the same. Further, the optical function device 710 may be four passive optical filters. In this case, light propagating through the SCFs 721 to 724 passes through passive optical filters different from one another, and is output to the SCFs 725 to 728. The passive optical filter is an optical filter having a fixed transmission property.

The above-mentioned functions of the optical function device 710 are examples, and the functions of the optical function device 710 and the optical devices configuring the optical function device 710 are not limited to the optical wave shaper, the optical coupler, and the like described above. Further, the MCF 731 or the MCF 732 may be connected to an MCF interface of another optical function device.

In the optical processing unit 700, the optical function device 710 is connected to the single core fiber side of the FIFOs 711 and 712, and the MCF interface is present on the multicore fiber side of the FIFOs 711 and 712. The optical processing unit 700 thus configured can use the MCFs 731 and 732 as the MCF interfaces, and hence facilitates connection with another multicore fiber. Therefore, when the optical processing unit 700 is mounted to an optical transmission device, connection with a multicore fiber connected to the outside of the optical transmission device or another optical processing unit including an MCF interface is facilitated. In other words, with the optical processing unit 700, the multicore fiber and the optical transmission device can easily be connected to each other at the time of manufacturing the optical transmission device.

The number of cores of the MCFs 731 and 732 is not limited to four. Further, the number of inputs and outputs of the optical function device 710 may also be increased or reduced according to the number of cores of the MCFs 731 and 732. For example, the optical processing unit 700 is applicable to an MCF transmission device connected to an external MCF including five or more cores, by using multicore fibers each including five or more cores as the MCFs 731 and 732 and using the optical function device 710 including five or more sets of inputs and outputs.

Fifth Example Embodiment

Figure 16:
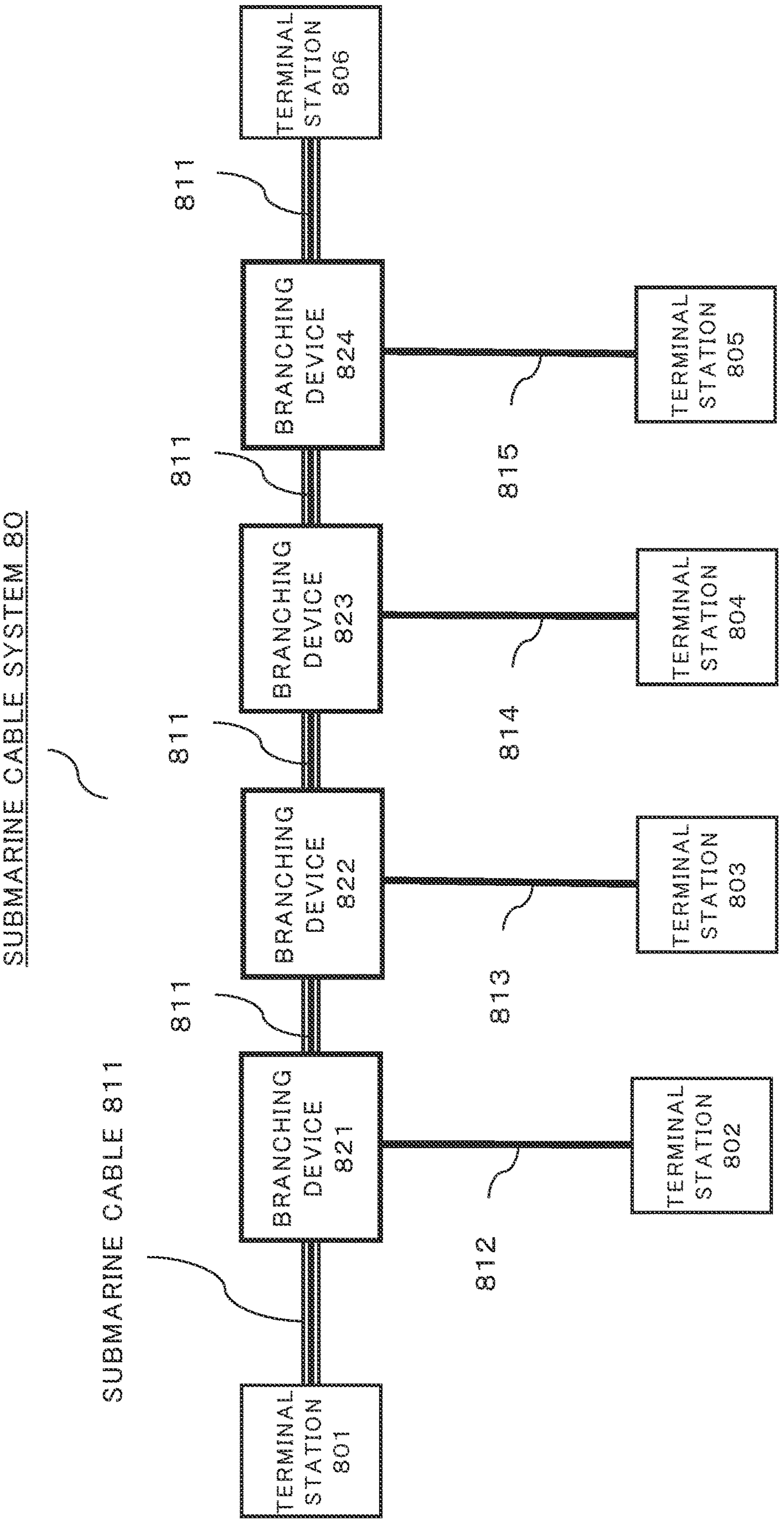
FIG. 16 is a block diagram illustrating a configuration example of a submarine cable system 80.

FIG. 16 is a block diagram illustrating a configuration example of a submarine cable system 80 according to the present invention. The submarine cable system 80 includes terminal stations 801 to 806, submarine cables 811 and 815, and branching devices 821 to 824. The submarine cable 811 is an optical cable including a single core fiber and a multicore fiber. Further, the submarine cables 812, 813, and 815 are optical cables including multicore fibers. The submarine cable 814 is an optical cable including single core fibers. The terminal stations 801 to 806 are station buildings installed on land. The terminal stations 801 to 806 are connected in a mutually communicable manner, based on the specification of the submarine cable system 80, and each includes an optical communication device that terminates an optical signal transmitted through a connected submarine cable. Each of the branching devices 821 to 824 is the MCF transmission device 102 connectable to three multicore fibers, which is illustrated in FIG. 4, for example.

Figure 17:
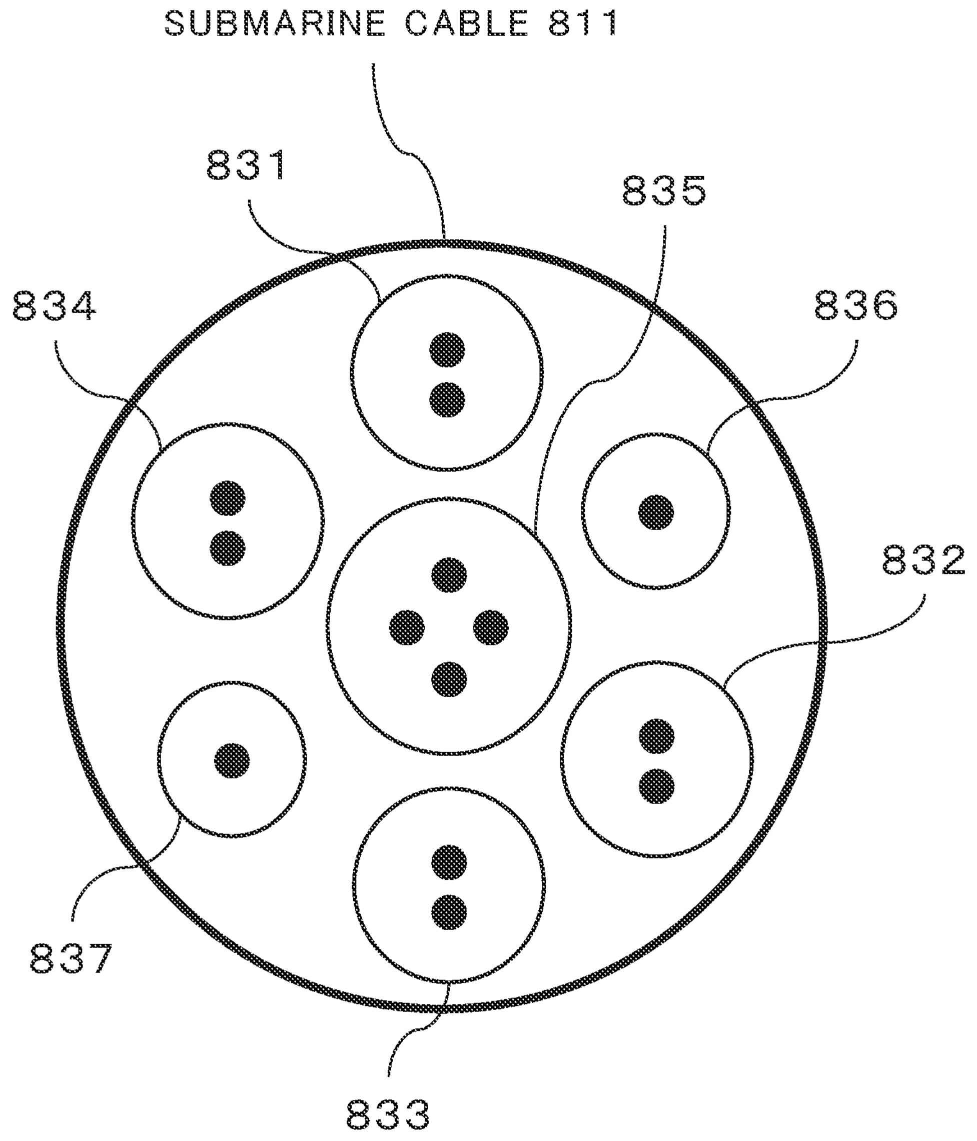
FIG. 17 is a cross-sectional diagram schematically illustrating an example of optical fibers included in a submarine cable 811.

FIG. 17 is a cross-sectional diagram schematically illustrating an example of optical fibers included in the submarine cable 811. The submarine cable 811 connects the terminal station 801 and the terminal station 806 to each other via the branching devices 821 to 824. The black point in FIG. 17 indicates a core of each fiber. The submarine cable 811 includes MCFs 831 to 834 each of which is a two-core multicore fiber, an MCF 835 being a four-core multicore fiber, and SCFs 836 to 837 each of which is a single core fiber. The submarine cables 812 and 813 each include two two-core multicore fibers. The submarine cable 814 includes four single core fibers. The submarine cable 815 includes two four-core multicore fibers.

Figure 18:
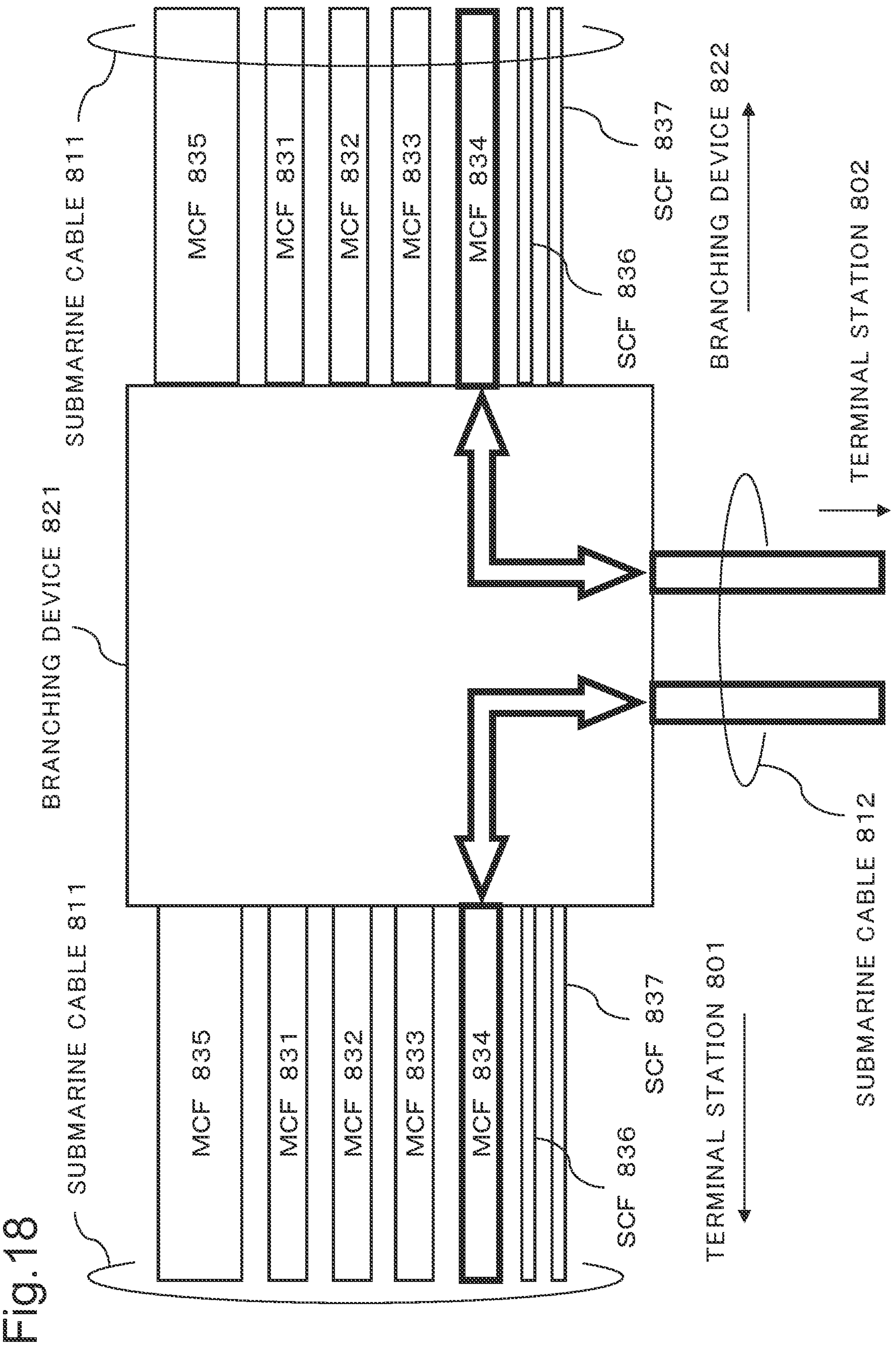
FIG. 18 is a diagram illustrating a connection example of submarine cables 811 and 812 in a branching device 821.

FIG. 18 is a diagram illustrating a connection example of the submarine cables 811 and 812 in the branching device 821. Inside the branching device 821, each core of the MCF 834 is connected to each core of the two multicore fibers of the submarine cable 812. For example, the MCF 834 and the submarine cable 812 are connected to the MCF interface of the optical processing unit (for example, the optical processing unit 112 illustrated in FIG. 4) included in the branching device 821. The optical processing unit included in the branching device 821 sets the connection relationship between the MCF 834 and the MCF included in the submarine cable 812.

Figure 19:
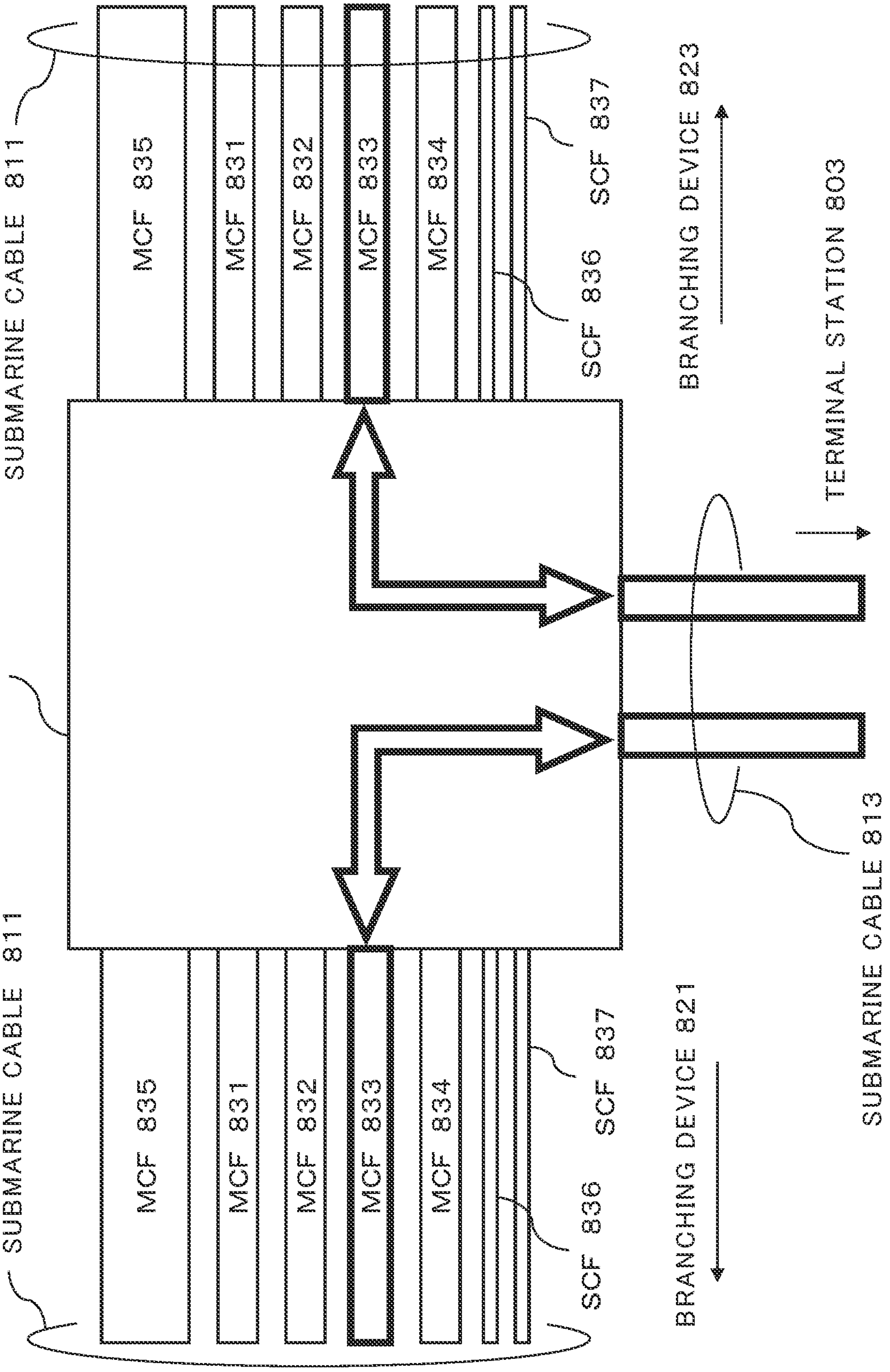
FIG. 19 is a diagram illustrating a connection example of submarine cables 811 and 813 in a branching device 822.

FIG. 19 is a diagram illustrating a connection example of the submarine cables 811 and 813 in the branching device 822. Inside the branching device 822, each core of the MCF 833 is connected to each core of the two multicore fibers of the submarine cable 813. For example, the MCF 833 and the submarine cable 813 are connected to the MCF interface of the optical processing unit (for example, the optical processing unit 112 illustrated in FIG. 4) included in the branching device 822. The optical processing unit included in the branching device 822 sets the connection relationship between the MCF 833 and the MCF included in the submarine cable 813.

Figure 20:
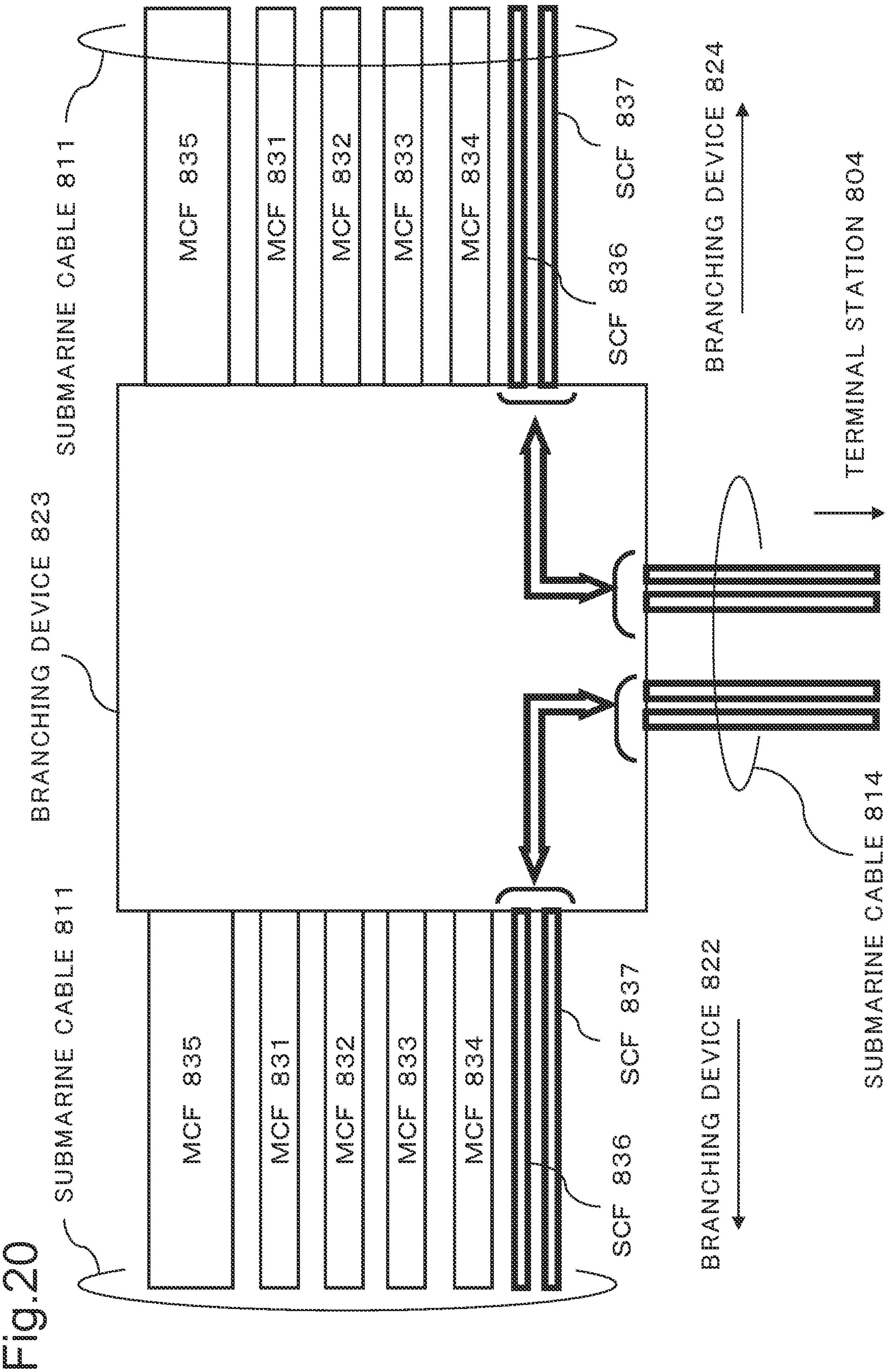
FIG. 20 is a diagram illustrating a connection example of submarine cables 811 and 814 in a branching device 823.

FIG. 20 is a diagram illustrating a connection example of the submarine cables 811 and 814 in the branching device 823. Inside of the branching device 823, each core of the SCF 836 and the SCF 837 is connected to each core of the submarine cable 814. The SCFs 836 and 837 may be connected directly to the optical component of the optical processing unit included in the branching device 823. The optical processing unit included in the branching device 823 sets the connection relationship between the SCFs 836 and 837, and the SCF included in the submarine cable 814.

Figure 21:
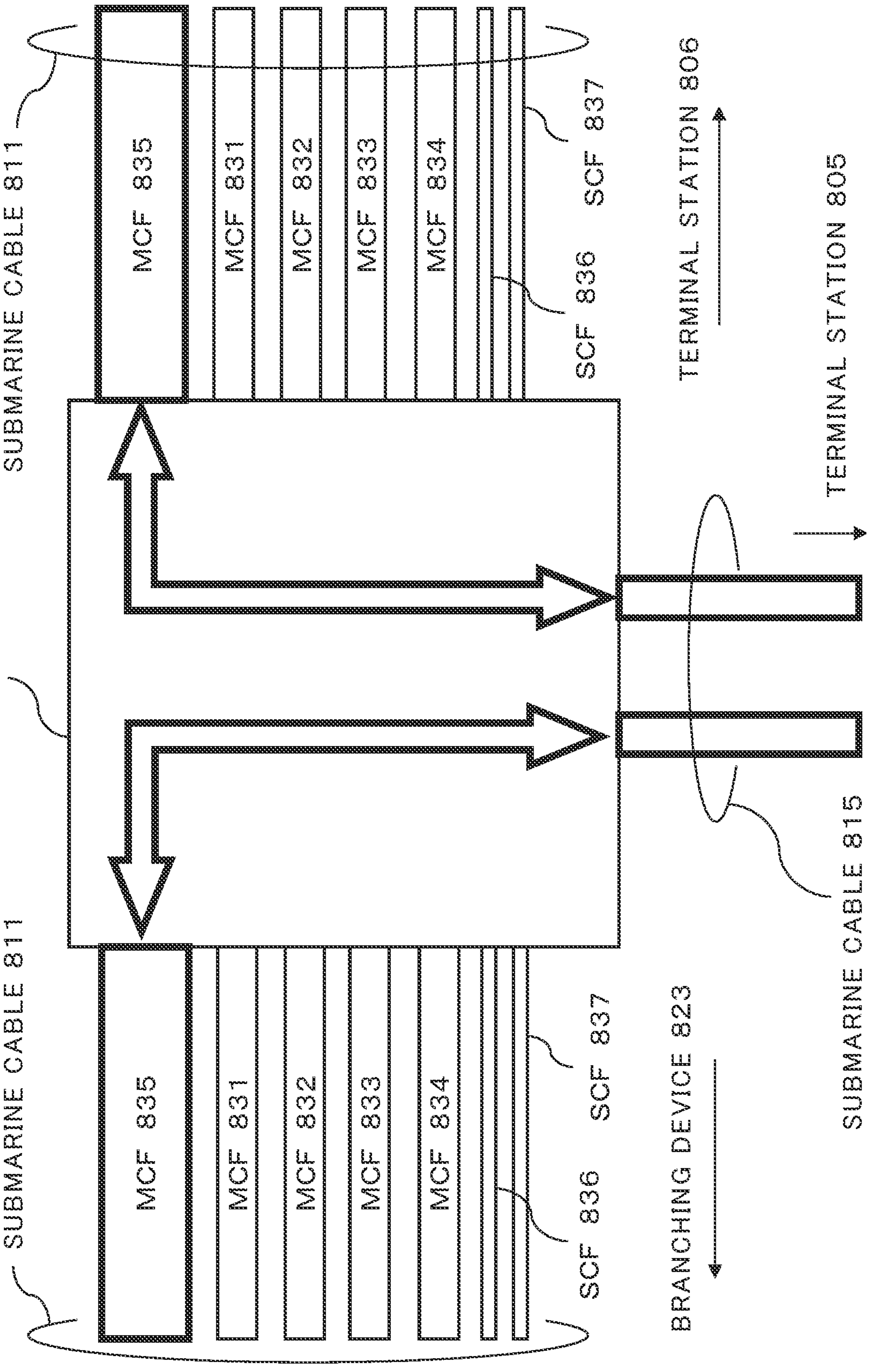
FIG. 21 is a diagram illustrating a connection example of the submarine cable 811 and a submarine cable 815 in a branching device 824.
Figure 22:
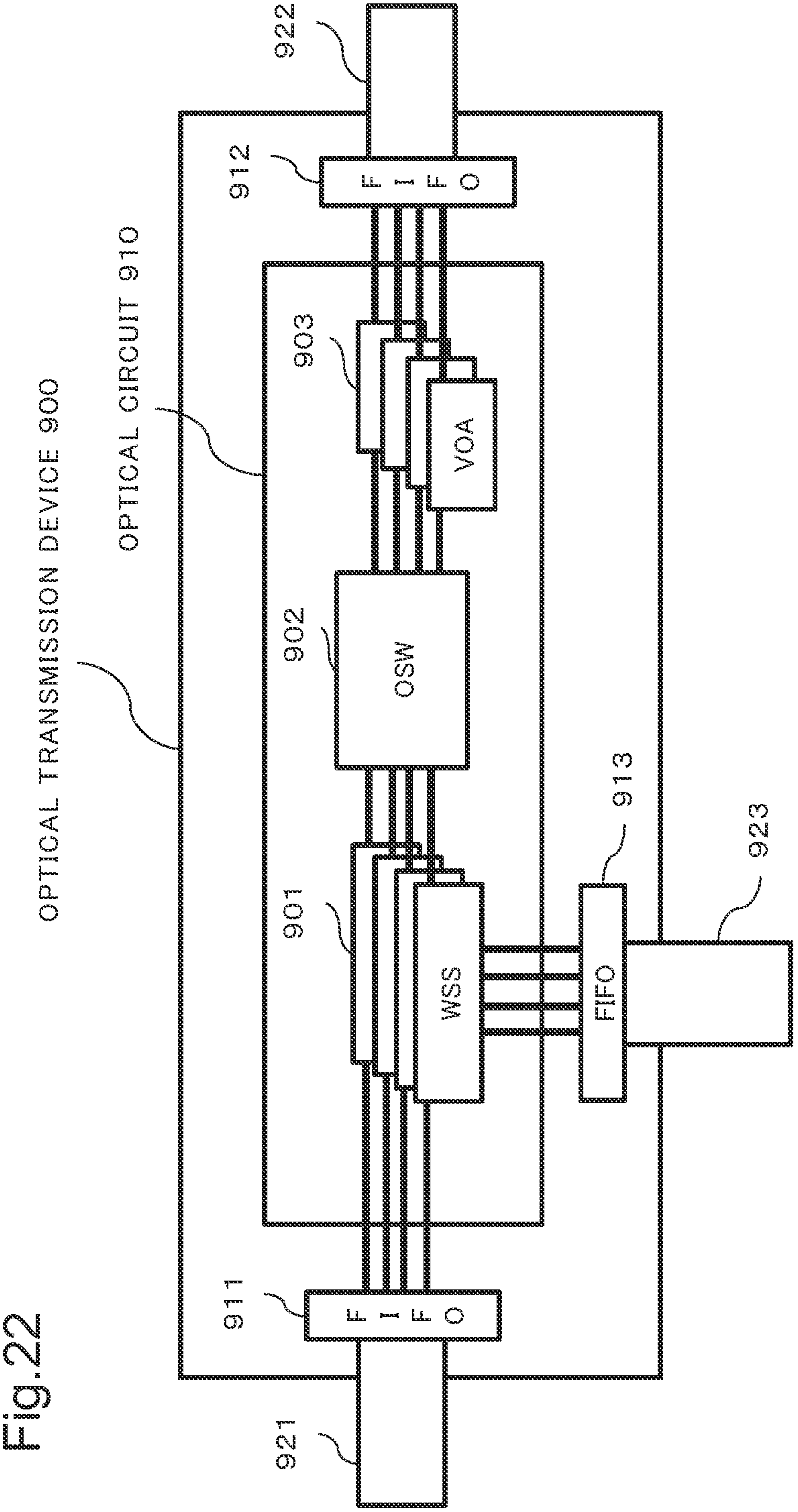
FIG. 22 is a block diagram illustrating a configuration of a general optical transmission device 900.

FIG. 21 is a diagram illustrating a connection example of the submarine cable 811 and the submarine cable 815 in the branching device 824. Inside of the branching device 824, each core of the MCF 835 is connected to each core of the submarine cable 815. For example, the MCF 835 and the submarine cable 815 are connected to the MCF interface (for example, the MCF interfaces 133, 136, and 137 in FIG. 4) included in the branching device 824. The optical processing unit included in the branching device 824 sets the connection relationship between the MCF 835 and the MCF included in the submarine cable 815.

The submarine cable system 80 thus configured includes the branching devices 821 to 824. Further, the branching devices 821 to 824 include the MCF interfaces, and hence connection to a submarine cable including a multicore fiber is facilitated. Therefore, the branching devices 821 to 824 facilitate connection to a submarine cable at the time of establishing the submarine cable system 80.

Further, as illustrated in FIG. 17, the submarine cable 811 includes a configuration acquired by combining the single core fibers, the two-core multicore fibers, and the four-core multicore fiber. With this, the submarine cable 811 can be split or coupled in a unit of a multicore fiber or a single core fiber in each of the branching devices, according to the configuration of the submarine cable system 80. As a result, an operation of connecting submarine cables in the branching devices 821 to 824 is facilitated.

The example embodiments of the invention of the present application may be described as, but not limited to, the following supplementary notes.

(Supplementary Note 1)

An optical transmission device being connected to an optical cable including a first multicore fiber including a plurality of cores, the optical transmission device including:

- an optical processing means including:
  - a multicore fiber interface including a second multicore fiber including a plurality of cores being able to be fusion-spliced to an end portion of the first multicore fiber; and
  - at least one optical component being connected to the multicore fiber interface and being configured to execute predetermined processing on each piece of light being coupled to the plurality of cores of the multicore fiber interface.

(Supplementary Note 2)

The optical transmission device according to Supplementary note 1, wherein

- the optical processing means includes a plurality of the optical components,
- the plurality of the optical components each include the multicore fiber interface, and
- the plurality of the optical components are connected to one another via the multicore fiber interface.

(Supplementary Note 3)

The optical transmission device according to Supplementary note 1 or 2, wherein

- the optical processing means includes a first multicore fiber interface and a second multicore fiber interface each of which is the multicore fiber interface,
- the first multicore fiber interface is connectable to a multicore fiber including M cores,
- the second multicore fiber interface is connectable to a multicore fiber including N cores,
- the optical component is an M×N optical matrix switch capable of externally controlling connection between cores of the first multicore fiber interface and cores of the second multicore fiber interface, and
- M and N are integers equal to or greater than two.

(Supplementary Note 4)

The optical transmission device according to Supplementary note 1 or 2, wherein

- the optical component includes:
  - a third multicore fiber;
  - a fourth multicore fiber; and
  - a rotation means,
- a cross section of the third multicore fiber and a cross section of the fourth multicore fiber face with each other on a same center axis, and
- the rotation means controls a rotation amount of the fourth multicore fiber about the center axis.

(Supplementary Note 5)

The optical transmission device according to Supplementary note 4, wherein the rotation means controls a connection relationship between the plurality of cores facing with each other, by controlling the rotation amount.

(Supplementary Note 6)

The optical transmission device according to Supplementary note 4, wherein the rotation means controls a connection loss between the plurality of cores facing with each other, by controlling the rotation amount.

(Supplementary Note 7)

The optical transmission device according to any one of Supplementary notes 4 to 6, wherein a plurality of cores of the third multicore fiber are arranged at an equal interval on a circle having the center axis of the first multicore fiber as a center, and the fourth multicore fiber has core arrangement similar to that of the third multicore fiber.

(Supplementary Note 8)

The optical transmission device according to Supplementary note 1 or 2, wherein the optical component includes:

a FIFO; and an optical function device being optically coupled to each core of the FIFO.

(Supplementary Note 9)

An optical cable system including:

the optical transmission device according to any one of Supplementary note 1 to 8; and a plurality of terminal stations being connected to the optical transmission device via the optical cables different from one another.

(Supplementary Note 10)

The optical cable system according to Supplementary note 9, wherein the optical transmission device includes a function of splitting the optical cable, and the optical cable includes a multicore fiber including cores matching in number with cores split by the optical transmission device.

(Supplementary Note 11)

A method of manufacturing an optical transmission device being connectable to a first multicore fiber that is provided to an optical cable and includes a plurality of cores, the method including:

fusion-splicing an optical processing means to the optical cable at one end of the multicore fiber interface, the optical processing means including:

a multicore fiber interface including a second multicore fiber including a plurality of cores being connectable to an end portion of the first multicore fiber; and at least one optical component being connected to another end of the multicore fiber interface and being configured to execute predetermined processing on each piece of light coupled to the plurality of cores of the multicore fiber interface.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, the configurations described in the example embodiments are not necessarily excluded from each other. The actions and effects of the present invention may be achieved by a configuration acquired by combining all or some of the example embodiments described above.

REFERENCE SIGNS LIST

80 Submarine cable system
100 to 103 MCF transmission device
110 to 113 Optical processing unit
121 to 125 Optical component
131 to 137 MCF interface
201 to 203 MCF
301 Connection unit
311 and 312 MCF
501 WSS
511 to 516, 611 to 622 SCF
518 and 519, 632 to 635 Region
517, 631 LCOS
601 WSS
641 to 643, 711, 712 FIFO
644 to 646, 731, 732 MCF
700 Optical processing unit
710 Optical function device
721 to 728 SCF
801 to 806 Terminal station
801 to 803 MCF
806 Terminal station
811 to 815 Submarine cable
821 to 824 Branching device
831 to 834 Two-core MCF
835 Four-core MCF
836 to 837 SCF
900 Optical transmission device
901 Wavelength selective switch
902 Optical switch
903 Variable optical attenuator
910 Optical circuit
921 to 923 MCF

What is claimed is:

1. An optical transmission device being connected to an optical cable including a first multicore fiber including a plurality of cores, the optical transmission device comprising: an optical processor including:

a multicore fiber interface including a second multicore fiber including a plurality of cores being able to be fusion-spliced to an end portion of the first multicore fiber; and at least one optical component being connected to the multicore fiber interface and being configured to execute predetermined processing on each piece of light being coupled to the plurality of cores of the multicore fiber interface, wherein the optical component includes:

a third multicore fiber;

a fourth multicore fiber; and a rotator, a cross section of the third multicore fiber and a cross section of the fourth multicore fiber face with each other on a same center axis, and the rotator controls a rotation amount of the fourth multicore fiber about the center axis.

2. The optical transmission device according to claim 1, wherein the optical processor includes a plurality of the optical components, the plurality of the optical components each include the multicore fiber interface, and the plurality of the optical components are connected to one another via the multicore fiber interface.

3. The optical transmission device according to claim 1, wherein the rotator controls a connection relationship between the plurality of cores facing with each other, by controlling the rotation amount.

4. The optical transmission device according to claim 1, wherein the rotator controls a connection loss between the plurality of cores facing with each other, by controlling the rotation amount.

5. The optical transmission device according to claim 1, wherein a plurality of cores of the third multicore fiber are arranged at an equal interval on a circle having a center axis of the first multicore fiber as a center, and the fourth multicore fiber has core arrangement similar to that of the third multicore fiber.

6. An optical cable system comprising:

an optical transmission device being connected to an optical cable including a first multicore fiber including a plurality of cores, the optical transmission device comprising:

an optical processor including:

a multicore fiber interface including a second multicore fiber including a plurality of cores being able to be fusion-spliced to an end portion of the first multicore fiber; and at least one optical component being connected to the multicore fiber interface and being configured to execute predetermined processing on each piece of light being coupled to the plurality of cores of the multicore fiber interface; and a plurality of terminal stations being connected to the optical transmission device via the optical cables different from one another, wherein the optical component includes:

a third multicore fiber;

a fourth multicore fiber; and a rotator, a cross section of the third multicore fiber and a cross section of the fourth multicore fiber face with each other on a same center axis, and the rotator controls a rotation amount of the fourth multicore fiber about the center axis.

7. The optical cable system according to claim 6, wherein the optical transmission device includes a function of splitting the optical cable, and the optical cable includes a multicore fiber including cores matching in number with cores split by the optical transmission device.

8. A method of manufacturing an optical transmission device being connectable to a first multicore fiber that is provided to an optical cable and includes a plurality of cores, the method comprising:

fusion-splicing an optical processor to the optical cable at one end of the multicore fiber interface, the optical processor including:

a multicore fiber interface including a second multicore fiber including a plurality of cores being connectable to an end portion of the first multicore fiber; and at least one optical component being connected to another end of the multicore fiber interface and being configured to execute predetermined processing on each piece of light coupled to the plurality of cores of the multicore fiber interface, wherein the optical component includes:

a third multicore fiber;

a fourth multicore fiber; and a rotator, a cross section of the third multicore fiber and a cross section of the fourth multicore fiber face with each other on a same center axis, and the rotator controls a rotation amount of the fourth multicore fiber about the center axis.

9. The optical cable system according to claim 6, wherein the optical processor includes a plurality of the optical components, the plurality of the optical components each include the multicore fiber interface, and the plurality of the optical components are connected to one another via the multicore fiber interface.

10. The optical cable system according to claim 6, wherein the rotator controls a connection relationship between the plurality of cores facing with each other, by controlling the rotation amount.

11. The optical cable system according to claim 6, wherein the rotator controls a connection loss between the plurality of cores facing with each other, by controlling the rotation amount.

12. The optical transmission device according to claim 6, wherein a plurality of cores of the third multicore fiber are arranged at an equal interval on a circle having a center axis of the first multicore fiber as a center, and the fourth multicore fiber has core arrangement similar to that of the third multicore fiber.

* * * * *